(12) United States Patent
Sonoda et al.

(10) Patent No.: US 12,401,771 B2
(45) Date of Patent: Aug. 26, 2025

(54) OPTICAL SCANNING DEVICE, DRIVING METHOD OF OPTICAL SCANNING DEVICE, AND IMAGE DRAWING SYSTEM

(71) Applicant: FUJIFILM Corporation, Tokyo (JP)

(72) Inventors: Shinichiro Sonoda, Kanagawa (JP); Nobuya Tanaka, Kanagawa (JP); Hirotoshi Yoshizawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 411 days.

(21) Appl. No.: 18/180,551

(22) Filed: Mar. 8, 2023

(65) Prior Publication Data
US 2023/0314793 A1    Oct. 5, 2023

(30) Foreign Application Priority Data
Mar. 31, 2022 (JP) ................. 2022-061219

(51) Int. Cl.
  H04N 9/31 (2006.01)
  G02B 26/08 (2006.01)
  G02B 26/10 (2006.01)
  G03B 21/00 (2006.01)
  G09G 3/02 (2006.01)

(52) U.S. Cl.
  CPC ....... *H04N 9/3135* (2013.01); *G02B 26/0858* (2013.01); *G02B 26/105* (2013.01); *G03B 21/008* (2013.01); *G09G 3/025* (2013.01)

(58) Field of Classification Search
  CPC .. H04N 9/3135; H04N 9/3129; G02B 26/105; G02B 26/0858; G09G 3/025
  See application file for complete search history.

(56) References Cited

U.S. PATENT DOCUMENTS

2004/0218155 A1* 11/2004 Schenk ............... G02B 27/18
                                             348/E5.139
2008/0231683 A1    9/2008 Nishizawa

FOREIGN PATENT DOCUMENTS

| JP | 2012-68349 A | 4/2012 |
| JP | 2016-184018 A | 10/2016 |
| JP | 2018-132666 A | 8/2018 |

OTHER PUBLICATIONS

Extended European Search Report dated Aug. 23, 2023 for Application No. 23164161.4.

* cited by examiner

*Primary Examiner* — Ryan D Howard
(74) *Attorney, Agent, or Firm* — Birch, Stewart, Kolasch & Birch, LLP

(57) ABSTRACT

A driving controller provides a first driving signal having a first driving frequency corresponding to a first set value to a first actuator, provides a second driving signal having a second driving frequency corresponding to a second set value to a second actuator, changes the first driving frequency by changing the first set value in units of a first number obtained by dividing the first set value by a greatest common divisor of the first set value and the second set value, and changes the second driving frequency by changing the second set value in units of a second number obtained by dividing the second set value by the greatest common divisor.

8 Claims, 23 Drawing Sheets

SUPERIMPOSITION

FIRST SIGNAL PROCESSING

OPTICAL SCANNING DEVICE, DRIVING METHOD OF OPTICAL SCANNING DEVICE, AND IMAGE DRAWING SYSTEM

CROSS-REFERENCE TO RELATED APPLICATIONS

This application claims priority from Japanese Patent Application No. 2022-061219, filed on Mar. 31, 2022, the entire disclosure of which is incorporated herein by reference.

BACKGROUND

1. Technical Field

The present disclosure relates to an optical scanning device, a driving method of an optical scanning device, and an image drawing system.

2. Description of the Related Art

A micromirror device (also referred to as a microscanner) has been known as one of micro electro mechanical systems (MEMS) devices manufactured using the silicon (Si) nano-fabrication technique. An optical scanning device comprising the micromirror device has a small size and low power consumption and thus, is expected to be applied to image drawing systems such as laser displays or laser projectors.

In the micromirror device, a mirror portion is formed to be capable of swinging around a first axis and a second axis that are orthogonal to each other, and the swing of the mirror portion around each axis causes light reflected by the mirror portion to be two-dimensionally scanned.

In addition, a micromirror device that can perform Lissajous scanning of light by causing a mirror portion to resonate around each axis has been known.

JP2016-184018A discloses a technique for selecting a driving frequency of a MEMS mirror and a frame rate that is a rate at which one cycle of scanning of the MEMS mirror is performed, based on an amplitude and a phase of the MEMS mirror.

SUMMARY

In a case where a frequency ratio between a frequency of a first driving signal for the swing of the mirror portion around the first axis and a frequency of a second driving signal for the swing of the mirror portion around the second axis changes, a scanning path of the light changes. Consequently, a blur occurs in a drawn image. In the technology disclosed in JP2016-184018A, constantly maintaining the frequency ratio between the frequency of the first driving signal and the frequency of the second driving signal in a case of changing the frequency of the first driving signal and the frequency of the second driving signal is not considered.

The present disclosure is conceived in view of the above matter, and an object thereof is to provide an optical scanning device, a driving method of an optical scanning device, and an image drawing system that can constantly maintain a frequency ratio between a frequency of a first driving signal and a frequency of a second driving signal in a case of changing the frequency of the first driving signal and the frequency of the second driving signal.

An optical scanning device according to an aspect of the present disclosure is an optical scanning device comprising a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and which intersects with the first axis, and at least one processor, in which the processor is configured to provide a first driving signal having a first driving frequency corresponding to a first set value to the first actuator, provide a second driving signal having a second driving frequency corresponding to a second set value to the second actuator, in a case of changing the first driving frequency and the second driving frequency, derive a greatest common divisor of the first set value and the second set value, change the first driving frequency by changing the first set value in units of a first number obtained by dividing the first set value by the greatest common divisor, and change the second driving frequency by changing the second set value in units of a second number obtained by dividing the second set value by the greatest common divisor. The first number and the second number are prime to each other.

In the optical scanning device according to the aspect of the present disclosure, the processor may be configured to change the first driving frequency and the second driving frequency at the same timing based on a common clock signal.

In addition, in the optical scanning device according to the aspect of the present disclosure, the common clock signal may be a clock signal in which a clock rises in accordance with a value obtained by multiplying the first set value by the second number, or a clock signal in which a clock rises in accordance with a value obtained by multiplying the second set value by the first number.

In addition, in the optical scanning device according to the aspect of the present disclosure, the processor may be configured to provide the first driving signal of which the first driving frequency is changed at a timing when a clock of a first clock signal in which a clock rises in accordance with a value obtained by multiplying the first set value by the second number rises, to the first actuator, and provide the second driving signal of which the second driving frequency is changed at a timing when a clock of a second clock signal in which a clock rises in accordance with a value obtained by multiplying the second set value by the first number rises, to the second actuator.

In the optical scanning device according to the aspect of the present disclosure, the processor may be configured to change the first driving frequency and the second driving frequency, change the first set value and the second number, and the second set value and the first number to values corresponding to the first driving frequency and to the second driving frequency after change, generate the first clock signal based on the first set value and on the second number after change, and generate the second clock signal based on the second set value and on the first number after change.

In addition, in the optical scanning device according to the aspect of the present disclosure, the processor may be configured to change the first driving frequency and the second driving frequency and change a phase difference between the first clock signal and the second clock signal before changing the first driving frequency and the second driving frequency to a phase difference obtained by multiplying the phase difference by a ratio of the first driving frequency before change to the first driving frequency after change.

A driving method of an optical scanning device according to another aspect of the present disclosure is a driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, and a second actuator that causes the mirror portion to swing around a second axis which is in the plane including the reflecting surface at the time of the standstill of the mirror portion and which intersects with the first axis, the driving method comprising providing a first driving signal having a first driving frequency corresponding to a first set value to the first actuator, providing a second driving signal having a second driving frequency corresponding to a second set value to the second actuator, deriving, in a case of changing the first driving frequency and the second driving frequency, a greatest common divisor of the first set value and the second set value, changing the first driving frequency by changing the first set value in units of a first number obtained by dividing the first set value by the greatest common divisor, and changing the second driving frequency by changing the second set value in units of a second number obtained by dividing the second set value by the greatest common divisor.

In addition, an image drawing system according to still another aspect of the present disclosure comprises above any optical scanning device, and a light source that irradiates the mirror portion with light.

According to the present disclosure, in a case of changing the frequency of the first driving signal and the frequency of the second driving signal, the frequency ratio between the frequency of the first driving signal and the frequency of the second driving signal can be constantly maintained.

DETAILED DESCRIPTION

Hereinafter, embodiments according to the technique of the present disclosure will be described in detail with reference to the drawings.

First Embodiment

Figure 1:
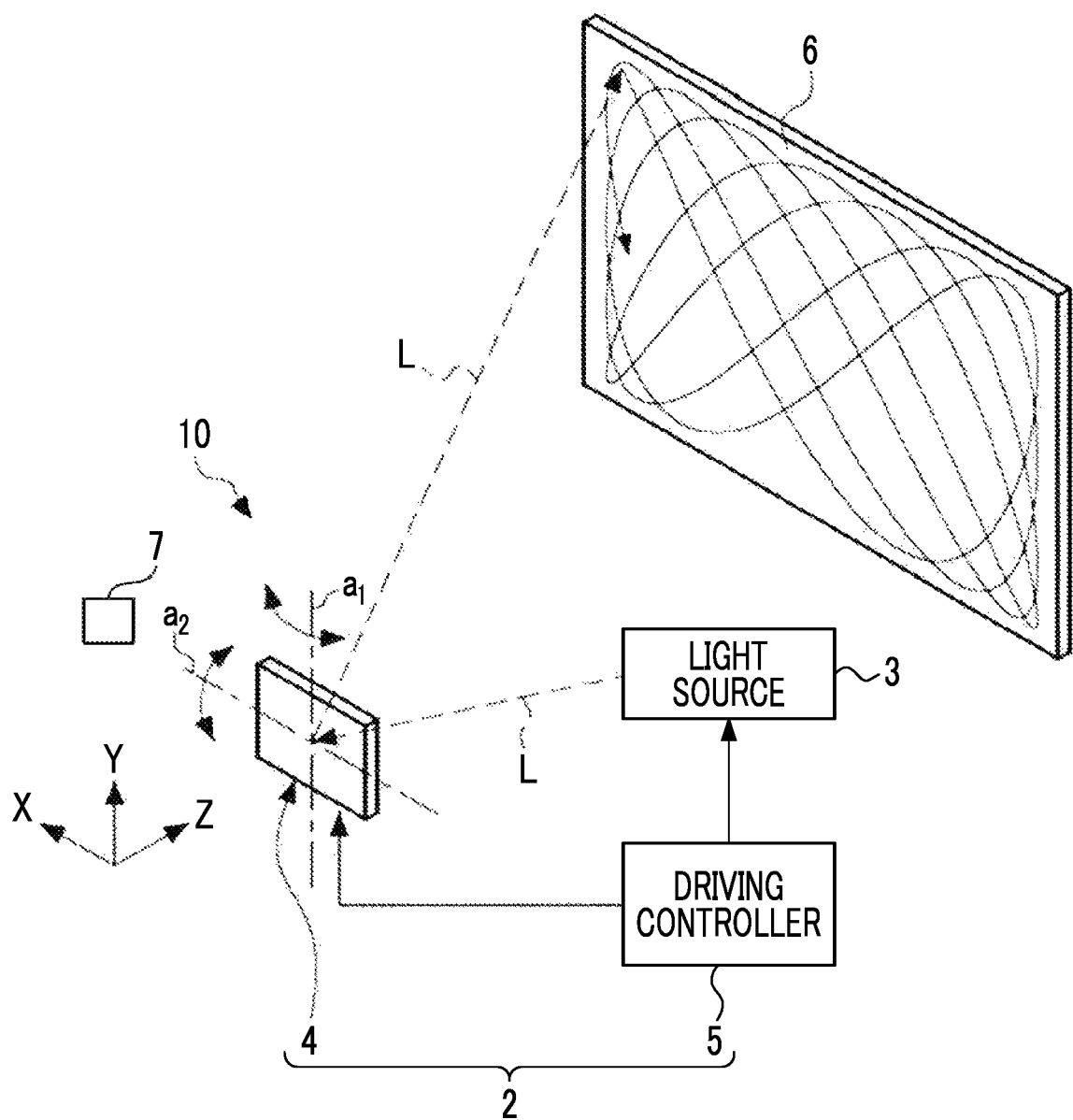
FIG. 1 is a schematic diagram of an image drawing system.

First, a configuration of an image drawing system 10 according to the present embodiment will be described with reference to FIG. 1. As shown in FIG. 1, the image drawing system 10 comprises an optical scanning device 2 and a light source 3. The optical scanning device 2 comprises a micromirror device (hereinafter, referred to as an "MMD") 4, a driving controller 5, and a temperature sensor 7. The driving controller 5 is an example of a processor according to the embodiment of the technique of the disclosure.

The image drawing system 10 draws an image by optically scanning a surface to be scanned 6 by reflecting a light beam L of irradiation from the light source 3 using the MMD 4 under control of the driving controller 5. The surface to be scanned 6 is, for example, a screen for projecting the image, or a retina of an eye of a person.

The image drawing system 10 is applied to, for example, a Lissajous scanning type laser display. Specifically, the image drawing system 10 can be applied to a laser scanning display such as augmented reality (AR) glasses or virtual reality (VR) glasses.

The MMD 4 is a piezoelectric biaxial drive type micromirror device capable of causing a mirror portion 20 (see FIG. 2) to swing around a first axis $a_1$ and around a second axis $a_2$ orthogonal to the first axis $a_1$. Hereinafter, a direction parallel to the second axis $a_2$ will be referred to as an X direction, a direction parallel to the first axis $a_1$ will be referred to as a Y direction, and a direction orthogonal to the first axis $a_1$ and to the second axis $a_2$ will be referred to as a Z direction. In the present embodiment, while an example in which the first axis $a_1$ is orthogonal to (that is, perpendicularly intersects with) the second axis $a_2$ is shown, the first axis $a_1$ may intersect with the second axis $a_2$ at an angle other than 90°. Here, intersecting means being within a constant angle range that is centered at 90 degrees and that includes a permissible error.

The light source 3 is a laser device that emits, for example, laser light as the light beam L. For example, the light source 3 outputs laser light of three colors of red (R), green (G), and blue (B). It is preferable that the light source 3 perpendicularly irradiates a reflecting surface 20A (see FIG. 2) comprised in the mirror portion 20 with the light beam L in a state where the mirror portion 20 of the MMD 4 is at a standstill. In a case where the reflecting surface 20A is perpendicularly irradiated with the light beam L from the light source 3, the light source 3 may be an obstacle in the drawing performed by scanning the surface to be scanned 6 with the light beam L. Thus, it is preferable that the reflecting surface 20A is perpendicularly irradiated with the light beam L emitted from the light source 3 by controlling the light beam L using an optical system such as a beam splitter. The optical system may include a lens or may not include a lens. In addition, an angle at which the reflecting surface 20A is irradiated with the light beam L emitted from the light source 3 is not limited to a perpendicular angle. The reflecting surface 20A may be irradiated with the light beam L in an inclined manner.

The driving controller 5 outputs a driving signal to the light source 3 and to the MMD 4 based on optical scanning information. The light source 3 generates the light beam L based on the input driving signal and irradiates the MMD 4 with the light beam L. The MMD 4 causes the mirror portion 20 to swing around the first axis $a_1$ and around the second axis $a_2$ based on the input driving signal.

The temperature sensor 7 is provided near the MMD 4. The temperature sensor 7 detects a temperature of an environment in which the MMD 4 is installed, and outputs a signal corresponding to the detected temperature to the driving controller 5.

By causing the mirror portion 20 to resonate around each of the first axis $a_1$ and the second axis $a_2$ via the driving controller 5, the light beam L reflected by the mirror portion 20 is scanned onto the surface to be scanned 6 such that the light beam L draws a Lissajous waveform. This optical scanning method is called a Lissajous scanning method.

Figure 2:
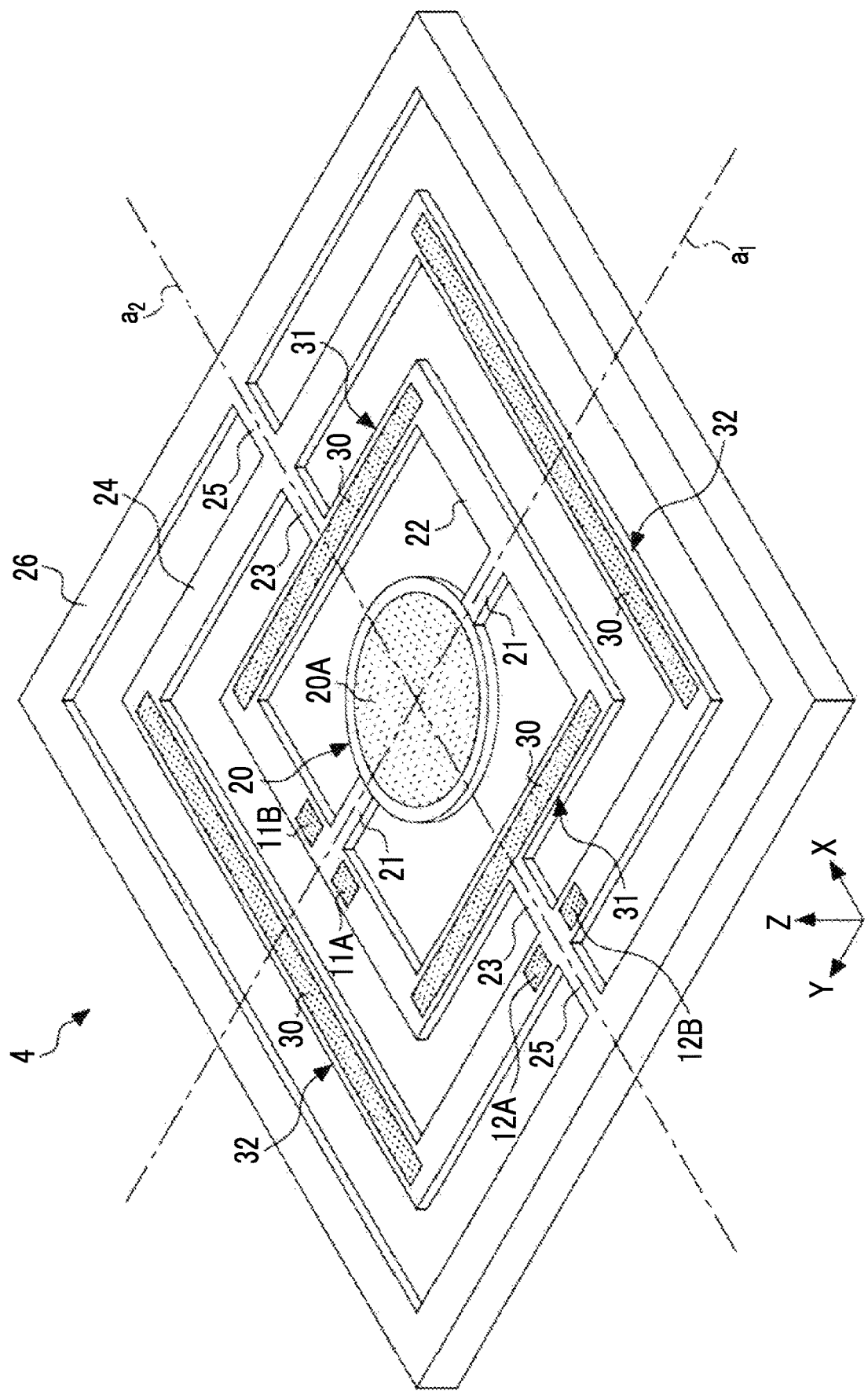
FIG. 2 is an external perspective view of a micromirror device.

Next, a configuration of the MMD 4 according to the present embodiment will be described with reference to FIG. 2. As shown in FIG. 2, the MMD 4 includes the mirror portion 20, a first support portion 21, a first movable frame 22, a second support portion 23, a second movable frame 24, a connecting portion 25, and a fixed frame 26. The MMD 4 is a so-called MEMS scanner.

The mirror portion 20 has the reflecting surface 20A for reflecting an incidence ray. The reflecting surface 20A is provided on one surface of the mirror portion 20 and is formed with a thin metal film of, for example, gold (Au), aluminum (Al), silver (Ag), or a silver alloy. A shape of the reflecting surface 20A is, for example, a circular shape centered at an intersection between the first axis $a_1$ and the second axis $a_2$.

The first axis $a_1$ and the second axis $a_2$ are present in a plane including the reflecting surface 20A at a time of a standstill when the mirror portion 20 is at a standstill. A planar shape of the MMD 4 is a rectangular shape and is axially symmetric with respect to the first axis $a_1$ and axially symmetric with respect to the second axis $a_2$.

The first support portion 21 is arranged outside the mirror portion 20 at each of positions that face each other with the second axis $a_2$ interposed therebetween. The first support portions 21 are connected to the mirror portion 20 on the first axis $a_1$ and support the mirror portion 20 to be capable of swinging around the first axis $a_1$. In the present embodiment, the first support portions 21 are torsion bars that stretch along the first axis $a_1$.

The first movable frame 22 is a frame having a rectangular shape surrounding the mirror portion 20 and is connected to the mirror portion 20 through the first support portion 21 on the first axis $a_1$. A piezoelectric element 30 is formed on the first movable frame 22 at each of positions that face each other with the first axis $a_1$ interposed therebetween. In such a manner, a pair of first actuators 31 are configured by forming two piezoelectric elements 30 on the first movable frame 22.

The pair of first actuators 31 are arranged at positions that face each other with the first axis $a_1$ interposed therebetween. The first actuators 31 cause the mirror portion 20 to swing around the first axis $a_1$ by applying rotational torque around the first axis $a_1$ to the mirror portion 20.

The second support portion 23 is arranged outside the first movable frame 22 at each of positions that face each other with the first axis $a_1$ interposed therebetween. The second support portions 23 are connected to the first movable frame 22 on the second axis $a_2$ and support the first movable frame 22 and the mirror portion 20 to be capable of swinging around the second axis $a_2$. In the present embodiment, the second support portions 23 are torsion bars that stretch along the second axis $a_2$.

The second movable frame 24 is a frame having a rectangular shape surrounding the first movable frame 22 and is connected to the first movable frame 22 through the second support portion 23 on the second axis $a_2$. The piezoelectric element 30 is formed on the second movable frame 24 at each of positions that face each other with the second axis $a_2$ interposed therebetween. In such a manner, a pair of second actuators 32 are configured by forming two piezoelectric elements 30 on the second movable frame 24.

The pair of second actuators 32 are arranged at positions that face each other with the second axis $a_2$ interposed therebetween. The second actuators 32 cause the mirror portion 20 to swing around the second axis $a_2$ by applying rotational torque about the second axis $a_2$ to the mirror portion 20 and to the first movable frame 22.

The connecting portion 25 is arranged outside the second movable frame 24 at each of positions that face each other with the first axis $a_1$ interposed therebetween. The connecting portions 25 are connected to the second movable frame 24 on the second axis $a_2$.

The fixed frame 26 is a frame having a rectangular shape surrounding the second movable frame 24 and is connected to the second movable frame 24 through the connecting portion 25 on the second axis $a_2$.

In addition, a pair of first angle detection sensors 11A and 11B are provided in the first movable frame 22 near the first support portions 21 at positions that face each other with the first axis $a_1$ interposed therebetween. Each of the pair of first angle detection sensors 11A and 11B is configured with a piezoelectric element. Each of the first angle detection sensors 11A and 11B outputs a signal by converting a force applied by deformation of the first support portion 21 accompanied by rotational movement of the mirror portion 20 around the first axis $a_1$ into a voltage. That is, the first angle detection sensors 11A and 11B output signals corresponding to an angle of the mirror portion 20 around the first axis $a_1$.

In addition, a pair of second angle detection sensors 12A and 12B are provided in the second movable frame 24 near the second support portions 23 at positions that face each other with the second axis $a_2$ interposed therebetween. Each of the pair of second angle detection sensors 12A and 12B is configured with a piezoelectric element. Each of the second angle detection sensors 12A and 12B outputs a signal by converting a force applied by deformation of the second support portion 23 accompanied by rotational movement of the mirror portion 20 around the second axis $a_2$ into a voltage. That is, the second angle detection sensors 12A and 12B output signals corresponding to an angle of the mirror portion 20 around the second axis $a_2$.

In FIG. 2, wiring lines and electrode pads for providing driving signals to the first actuators 31 and the second actuators 32 are not shown. In addition, in FIG. 2, wiring lines and electrode pads for outputting signals from the first angle detection sensors 11A and 11B and from the second angle detection sensors 12A and 12B are not shown. A plurality of electrode pads are provided on the fixed frame 26.

A deflection angle (hereinafter, referred to as a "first deflection angle") $\theta_1$ of the mirror portion 20 around the first axis $a_1$ is controlled based on the driving signal (hereinafter, referred to as a "first driving signal") provided to the first actuators 31 by the driving controller 5. The first driving signal is, for example, a sinusoidal alternating current voltage. The first driving signal includes a driving voltage waveform $V_{1A}(t)$ applied to one of the pair of first actuators 31 and a driving voltage waveform $V_{1A}(t)$ applied to the other. The driving voltage waveform $V_{1A}(t)$ and the driving voltage waveform $V_{1B}(t)$ are in anti-phase with each other (that is, have a phase difference of 180°).

The first deflection angle $\theta_1$ is an angle at which a line normal to the reflecting surface 20A is inclined with respect to the Z direction in an XZ plane.

A deflection angle (hereinafter, referred to as a "second deflection angle") $\theta_2$ of the mirror portion 20 around the second axis $a_2$ is controlled based on the driving signal (hereinafter, referred to as a "second driving signal") provided to the second actuators 32 by the driving controller 5. The second driving signal is, for example, a sinusoidal alternating current voltage. The second driving signal includes a driving voltage waveform $V_{2A}(t)$ applied to one of the pair of second actuators 32 and a driving voltage waveform $V_{2B}(t)$ applied to the other. The driving voltage waveform $V_{2A}(t)$ and the driving voltage waveform $V_{2B}(t)$ are in anti-phase with each other (that is, have a phase difference of 180°).

The second deflection angle $\theta_2$ is an angle at which the line normal to the reflecting surface 20A is inclined with respect to the Z direction in a YZ plane.

Figure 3:
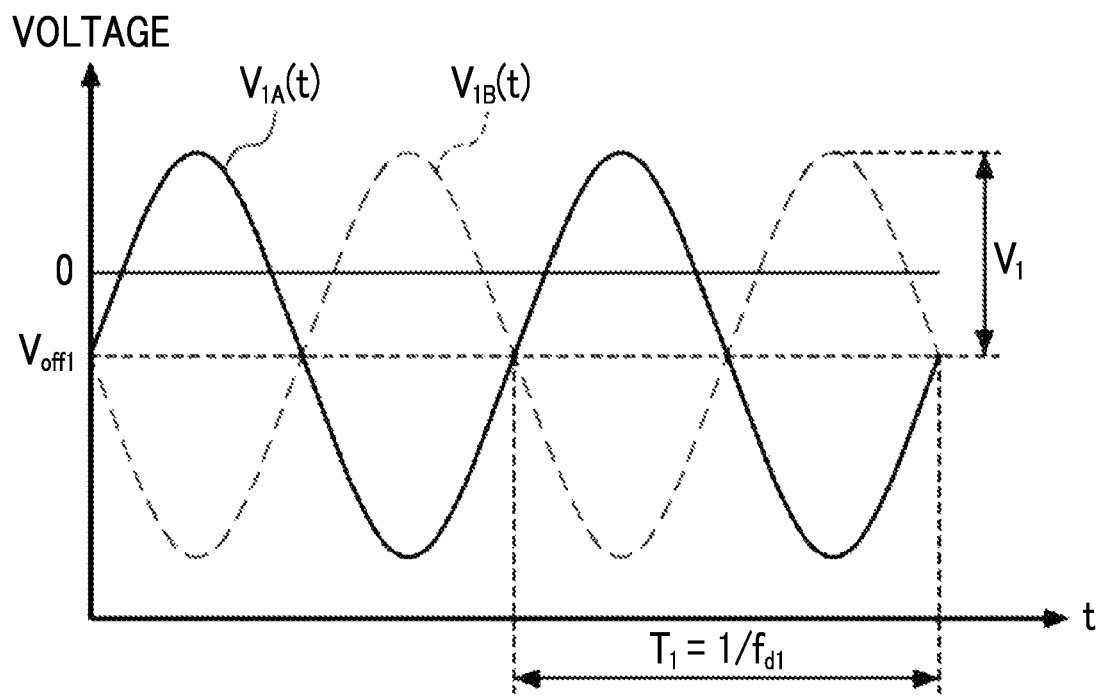
FIG. 3 is a graph showing an example of a first driving signal.
Figure 4:
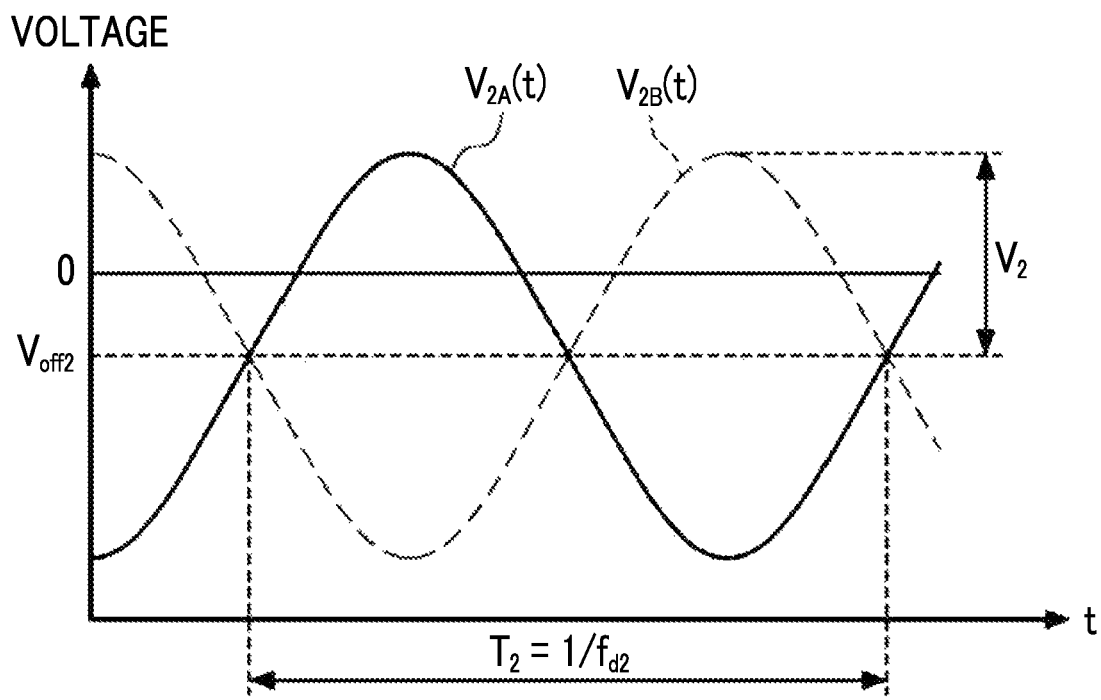
FIG. 4 is a graph showing an example of a second driving signal.

FIG. 3 shows an example of the first driving signal, and FIG. 4 shows an example of the second driving signal. FIG. 3 shows the driving voltage waveforms $V_{1A}(t)$ and $V_{1B}(t)$ included in the first driving signal. FIG. 4 shows the driving voltage waveforms $V_{2A}(t)$ and $V_{2B}(t)$ included in the second driving signal.

Each of the driving voltage waveforms $V_{1A}(t)$ and $V_{1B}(t)$ is represented as follows.

$$V_{1A}(t) = V_{off1} + V_1 \sin(2\pi f_{d1} t)$$

$$V_{1B}(t) = V_{off1} + V_1 \sin(2\pi f_{d1} t + \alpha)$$

Here, $V_1$ is an amplitude voltage. $V_{off1}$ is a bias voltage. $V_{off1}$ may be zero. In addition, $f_{d1}$ is a driving frequency (hereinafter, referred to as a "first driving frequency"). In addition, t is time. In addition, a is a phase difference between the driving voltage waveforms $V_{1A}(t)$ and $V_{1B}(t)$. In the present embodiment, for example, $\alpha=180°$ is assumed.

By applying the driving voltage waveforms $V_{1A}(t)$ and $V_{1B}(t)$ to the pair of first actuators 31, the mirror portion 20 swings around the first axis $a_1$ with the first driving frequency $f_{d1}$.

Each of the driving voltage waveforms $V_{2A}(t)$ and $V_{2B}(t)$ is represented as follows.

$$V_{2A}(t) = V_{off2} + V_2 \sin(2\pi f_{d2} t + \varphi)$$

$$V_{2B}(t) = V_{off2} + V_2 \sin(2\pi f_{d2} t + \beta + \varphi)$$

Here, $V_2$ is an amplitude voltage. $V_{off2}$ is a bias voltage. $V_{off2}$ may be zero. In addition, $f_{d2}$ is a driving frequency (hereinafter, referred to as a "second driving frequency"). In addition, t is time. In addition, p is a phase difference between the driving voltage waveforms $V_{2A}(t)$ and $V_{2B}(t)$. In the present embodiment, for example, $R=180°$ is assumed. In addition, p is a phase difference between the driving voltage waveforms $V_{1A}(t)$ and $V_{1B}(t)$ and the driving voltage waveforms $V_{2A}(t)$ and $V_{2B}(t)$.

By applying the driving voltage waveforms $V_{2A}(t)$ and $V_{2B}(t)$ to the pair of second actuators 32, the mirror portion 20 swings around the second axis $a_2$ with the second driving frequency $f_{d2}$.

In the present embodiment, the first driving frequency $f_{d1}$ is set to match a resonance frequency of the mirror portion 20 around the first axis $a_1$. The second driving frequency $f_{d2}$ is set based on the first driving frequency $f_{d1}$ and on a frequency ratio H between the first driving frequency $f_{d1}$ and the second driving frequency $f_{d2}$. The frequency ratio H is set based on scanning density of light corresponding to a drawing pattern. The MMD 4 is set such that the second driving frequency $f_{d2}$ matches a resonance frequency of the mirror portion 20 around the second axis $a_2$. In the present embodiment, $f_{d1} > f_{d2}$ is assumed. That is, the mirror portion 20 has a higher swing frequency around the first axis $a_1$ than a swing frequency around the second axis $a_2$. The first driving frequency $f_{d1}$ and the second driving frequency $f_{d2}$ may not necessarily match the resonance frequency. For example, each of the first driving frequency $f_{d1}$ and the second driving frequency $f_{d2}$ may be a frequency within a frequency range near the resonance frequency (for example, a half-width range of a frequency distribution having the resonance frequency as a peak value). For example, this frequency range is within a range of a so-called Q-value.

Figure 5:
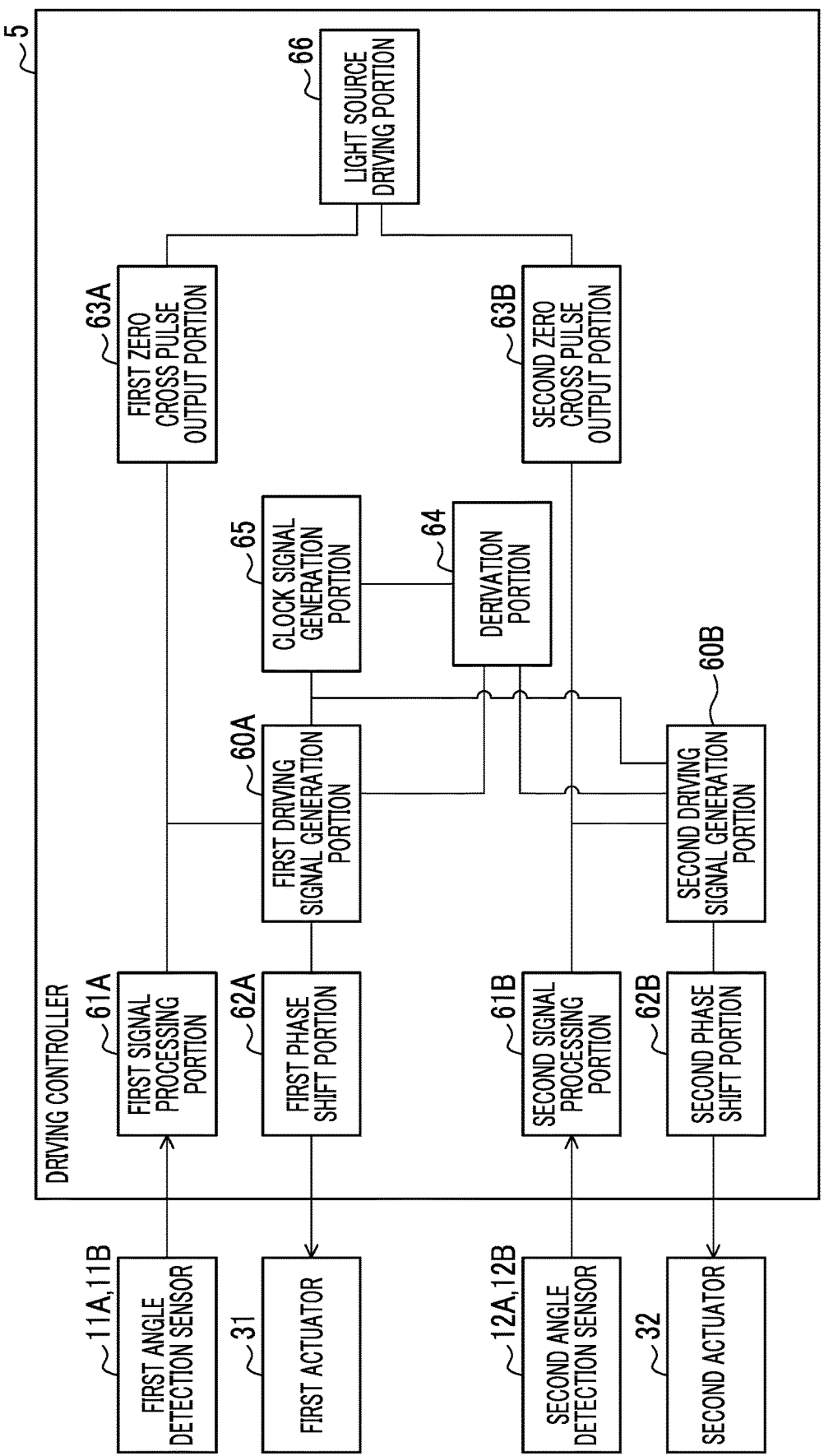
FIG. 5 is a block diagram showing an example of a functional configuration of a driving controller according to a first embodiment.

Next, a functional configuration of the driving controller 5 will be described with reference to FIG. 5. As shown in FIG. 5, the driving controller 5 includes a first driving signal generation portion 60A, a second driving signal generation portion 60B, a first signal processing portion 61A, a second signal processing portion 61B, a first phase shift portion 62A, a second phase shift portion 62B, a first zero cross pulse output portion 63A, a second zero cross pulse output portion 63B, a derivation portion 64, a clock signal generation portion 65, and a light source driving portion 66.

The first driving signal generation portion 60A, the first signal processing portion 61A, and the first phase shift portion 62A may perform a feedback control to maintain a vibration state where the swing of the mirror portion 20 around the first axis $a_1$ has a designated frequency. The second driving signal generation portion 60B, the second signal processing portion 61B, and the second phase shift portion 62B may perform a feedback control to maintain a vibration state where the swing of the mirror portion 20 around the second axis $a_2$ has a designated frequency.

The first driving signal generation portion 60A generates the first driving signal including the driving voltage waveforms $V_{1A}(t)$ and $V_{1B}(t)$ based on a reference waveform and provides the generated first driving signal to the pair of first actuators 31 through the first phase shift portion 62A. Accordingly, the mirror portion 20 swings around the first axis $a_1$.

The second driving signal generation portion 60B generates the second driving signal including the driving voltage waveforms $V_{2A}(t)$ and $V_{2B}(t)$ based on the reference waveform and provides the generated second driving signal to the pair of second actuators 32 through the second phase shift portion 62B. Accordingly, the mirror portion 20 swings around the second axis $a_2$.

The first driving signal generated by the first driving signal generation portion 60A and the second driving signal generated by the second driving signal generation portion 60B are synchronized in phase as shown by p in the expressions showing the driving voltage waveforms $V_{2A}(t)$ and $V_{2B}(t)$ included in the second driving signal.

The first angle detection sensors 11A and 11B output the signals corresponding to the angle of the mirror portion 20 around the first axis $a_1$. The second angle detection sensors 12A and 12B output the signals corresponding to the angle of the mirror portion 20 around the second axis $a_2$.

Figure 6:
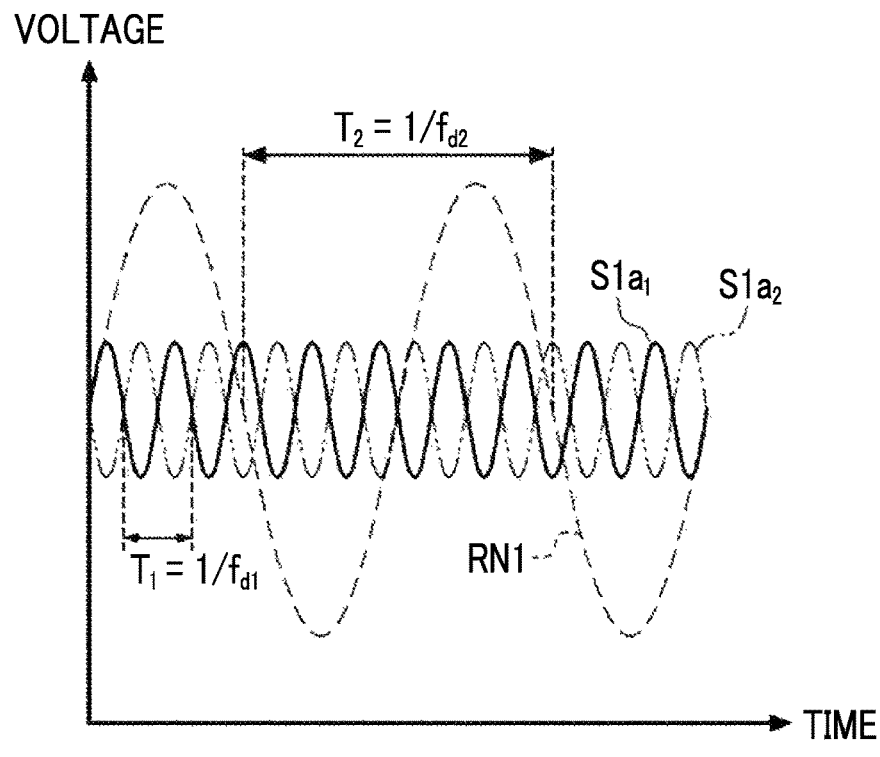
FIG. 6 is a diagram showing an example of signals output from a pair of first angle detection sensors.
Figure 6:
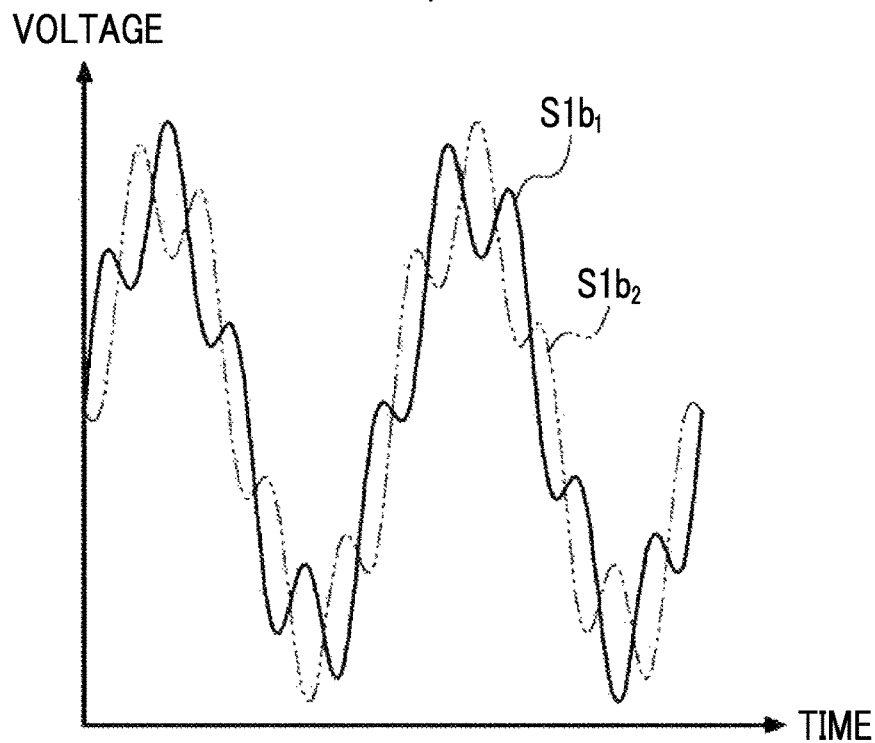

FIG. 6 shows an example of the signals output from the pair of first angle detection sensors 11A and 11B. In FIG. 6, $S1a_1$ and $S1a_2$ represent the signals output from the pair of first angle detection sensors 11A and 11B in a case where the mirror portion 20 is caused to swing around only the first axis $a_1$ and to not swing around the second axis $a_2$. The signals $S1a_1$ and $S1a_2$ are waveform signals similar to a sinusoidal wave having the first driving frequency $f_{d1}$ and are in anti-phase with each other.

In a case where the mirror portion 20 is caused to swing around the first axis $a_1$ and around the second axis $a_2$ at the same time, a vibration noise RN1 caused by the swing of the mirror portion 20 around the second axis $a_2$ is superimposed on the output signals of the pair of first angle detection sensors 11A and 11B. $S1b_1$ represents a signal after the vibration noise RN1 is superimposed on the signal $S1a_1$. $S1b_2$ represents a signal after the vibration noise RN1 is superimposed on the signal $S1a_2$. In the example in FIG. 6, the vibration noise RN1 is shown in a highlighted manner for description of the present embodiment.

Figure 7:
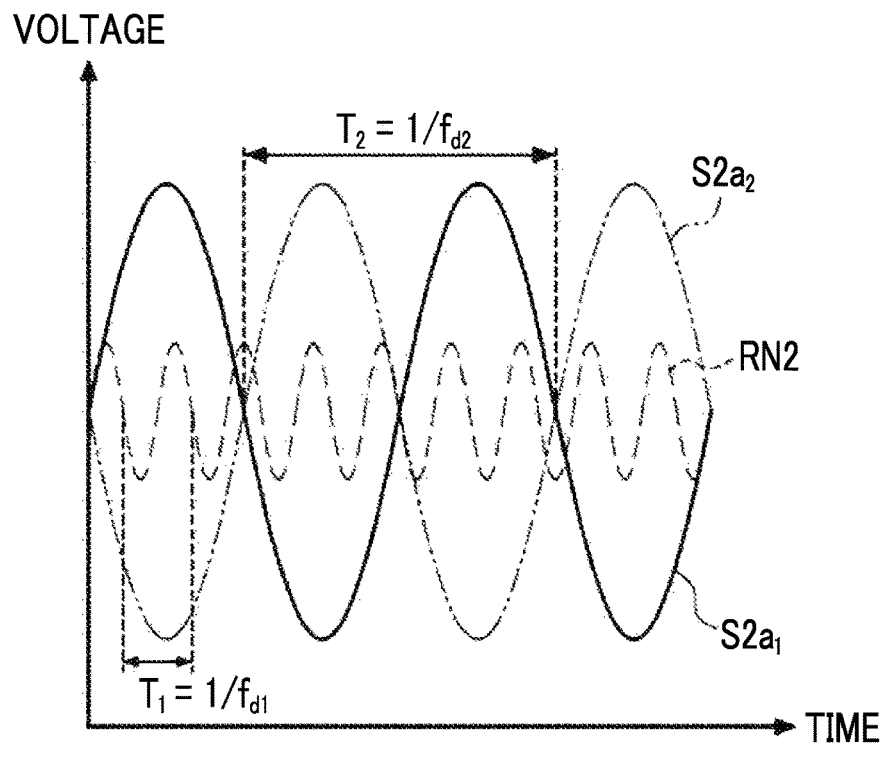
FIG. 7 is a diagram showing an example of signals output from a pair of second angle detection sensors.
Figure 7:
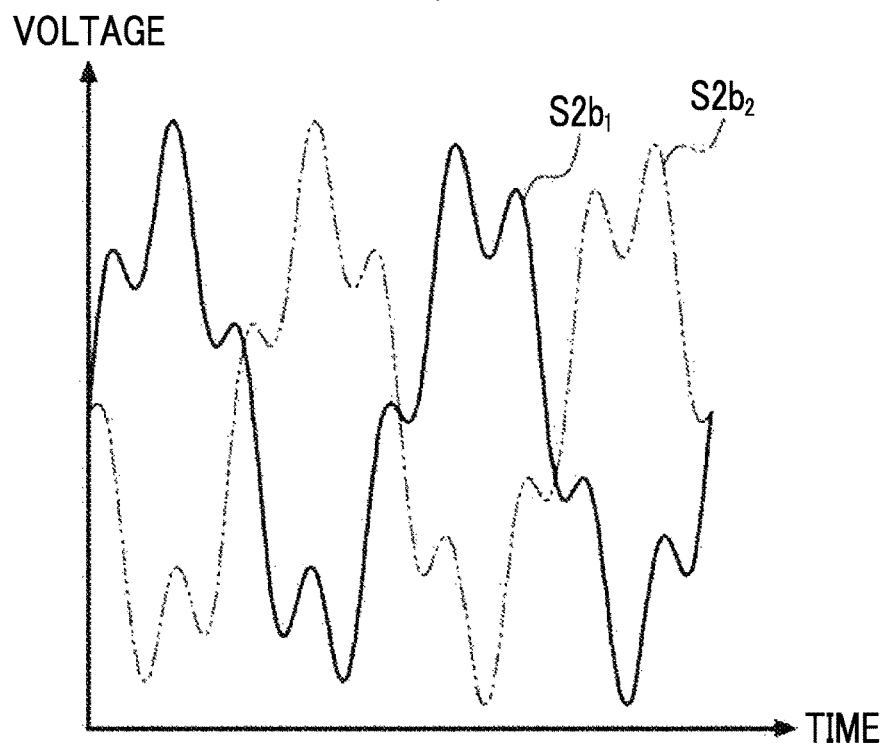

FIG. 7 shows an example of the signals output from the pair of second angle detection sensors 12A and 12B. In FIG. 7, $S2a_1$ and $S2a_2$ represent the signals output from the pair of second angle detection sensors 12A and 12B in a case where the mirror portion 20 is caused to swing around only the second axis $a_2$ and to not swing around the first axis $a_1$. The signals $S2a_1$ and $S2a_2$ are waveform signals similar to a sinusoidal wave having the second driving frequency $f_{d2}$ and are in anti-phase with each other.

In a case where the mirror portion 20 is caused to swing around the first axis $a_1$ and around the second axis $a_2$ at the same time, a vibration noise RN2 caused by the swing of the mirror portion 20 around the first axis $a_1$ is superimposed on the output signals of the pair of second angle detection sensors 12A and 12B. $S2b_1$ represents a signal obtained by the superimposition of the vibration noise RN2 on the signal $S2a_1$. $S2b_2$ represents a signal obtained by the superimposition of the vibration noise RN2 on the signal $S2a_2$. In the example in FIG. 7, the vibration noise RN2 is shown in a highlighted manner for description of the present embodiment.

The first signal processing portion 61A generates a signal (hereinafter, referred to as a "first angle detection signal") $S1c$ obtained by removing the vibration noise RN1 based on $S1a_1$ and $S1a_2$ output from the pair of first angle detection sensors 11A and 11B. The second signal processing portion 61B generates a signal (hereinafter, referred to as a "second angle detection signal") $S2c$ obtained by removing the vibration noise RN2 based on $S2a_1$ and $S2a_2$ output from the pair of second angle detection sensors 12A and 12B.

Figure 8:
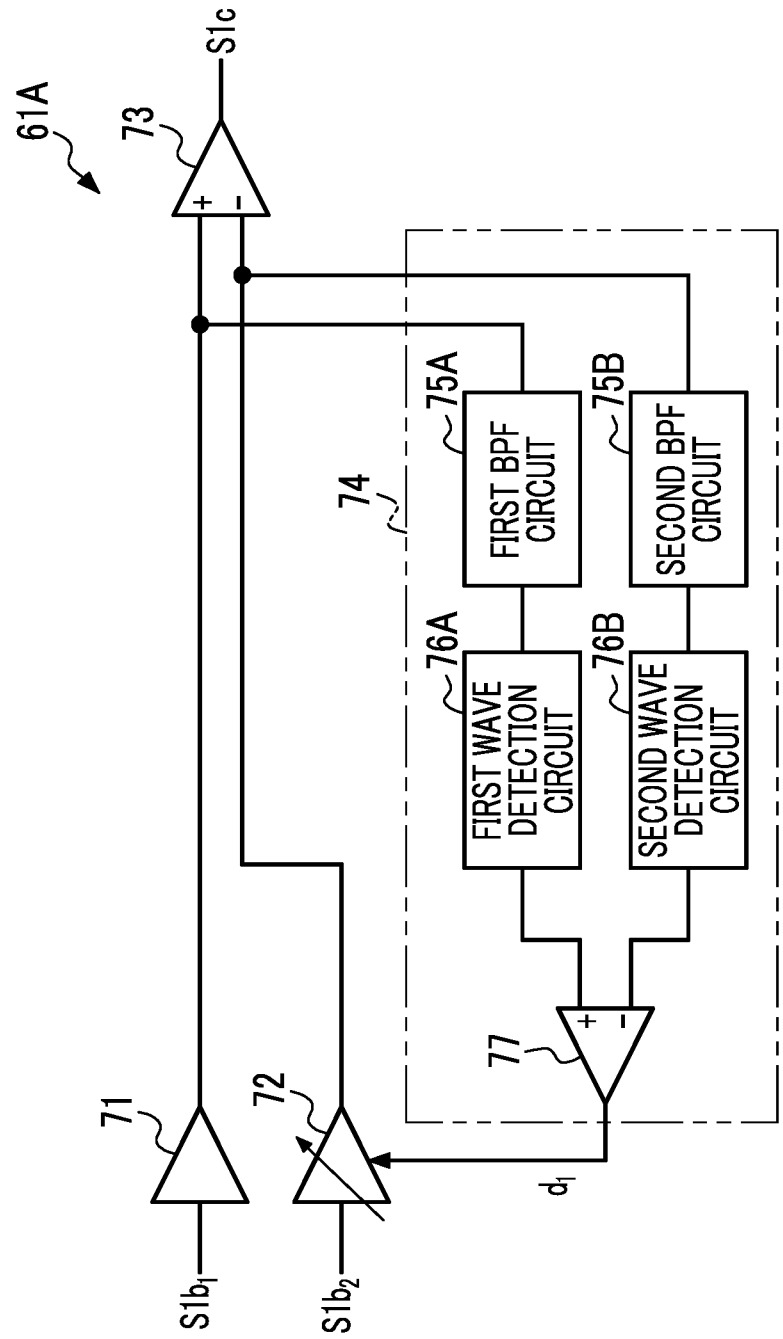
FIG. 8 is a circuit diagram showing an example of a configuration of a first signal processing portion.

The first signal processing portion 61A can be implemented by, for example, a circuit having a configuration shown in FIG. 8 as an example. As shown in FIG. 8, the first signal processing portion 61A is configured with a buffer amplifier 71, a variable gain amplifier 72, a subtraction circuit 73, and a gain adjustment circuit 74. The gain adjustment circuit 74 is configured with a first band pass filter (BPF) circuit 75A, a second BPF circuit 75B, a first wave detection circuit 76A, a second wave detection circuit 76B, and a subtraction circuit 77. The subtraction circuit 73 and the subtraction circuit 77 are differential amplification circuits configured with operational amplifiers.

The signal $S1b_1$ output from the first angle detection sensor 11A is input into a positive input terminal (non-inverting input terminal) of the subtraction circuit 73 through the buffer amplifier 71. In addition, a signal output from the buffer amplifier 71 branches in the middle of being input into the subtraction circuit 73 and is input into the first BPF circuit 75A in the gain adjustment circuit 74.

The signal $S1b_2$ output from the first angle detection sensor 11B is input into a negative input terminal (inverting input terminal) of the subtraction circuit 73 through the variable gain amplifier 72. In addition, a signal output from the variable gain amplifier 72 branches in the middle of being input into the subtraction circuit 73 and is input into the second BPF circuit 75B in the gain adjustment circuit 74.

Each of the first BPF circuit 75A and the second BPF circuit 75B has a passband B1 having the second driving frequency $f_{d2}$ as a center frequency. For example, the passband B1 is a frequency band of $f_{d2}\pm5$ kH. The vibration noise RN1 has the second driving frequency $f_{d2}$ and thus, passes through the passband B1. Accordingly, the first BPF circuit 75A extracts the vibration noise RN1 from the signal input from the buffer amplifier 71 and outputs the vibration noise RN1. The second BPF circuit 75B extracts the vibration noise RN1 from the signal input from the variable gain amplifier 72 and outputs the vibration noise RN1.

Each of the first wave detection circuit 76A and the second wave detection circuit 76B is configured with, for example, a root mean squared value to direct current converter (RMS-DC converter). The first wave detection circuit 76A converts an amplitude of the vibration noise RN1 input from the first BPF circuit 75A into a DC voltage signal and inputs the DC voltage signal into a positive input terminal of the subtraction circuit 77. The second wave detection circuit 76B converts the amplitude of the vibration noise RN1 input from the second BPF circuit 75B into a DC voltage signal and inputs the DC voltage signal into a negative input terminal of the subtraction circuit 77.

The subtraction circuit 77 outputs a value $d_1$ obtained by subtracting the DC voltage signal input from the second wave detection circuit 76B, from the DC voltage signal input from the first wave detection circuit 76A. The value $d_1$ corresponds to a difference between the amplitude of the vibration noise RN1 included in the signal $S1b_1$ output from the first angle detection sensor 11A and the amplitude of the vibration noise RN1 included in the signal $S1b_2$ output from the first angle detection sensor 11B. The subtraction circuit 77 inputs the value $d_1$ into a gain adjustment terminal of the variable gain amplifier 72 as a gain adjustment value.

The variable gain amplifier 72 adjusts an amplitude level of the signal $S1b_2$ by multiplying the signal $S1b_2$ input from the first angle detection sensor 11B by the value $d_1$ input as the gain adjustment value. In such a manner, by performing a feedback control via the gain adjustment circuit 74, the amplitude of the vibration noise RN1 included in the signal $S1b_2$ after passing through the variable gain amplifier 72 is adjusted to match the amplitude of the vibration noise RN1 included in the signal $S1b_1$ after passing through the buffer amplifier 71.

The subtraction circuit 73 outputs a value obtained by subtracting the signal $S1b_2$ input into the negative input terminal from the signal $S1b_1$ input into the positive input terminal. Since the amplitudes of the vibration noises RN1 included in both signals are matched by the feedback control, the vibration noises RN1 included in both signals are offset by subtraction processing performed by the subtraction circuit 73. Accordingly, the first angle detection signal $S1c$ (see FIG. 9) that is a signal obtained by removing the vibration noise RN1 is output from the subtraction circuit 73.

Figure 9:
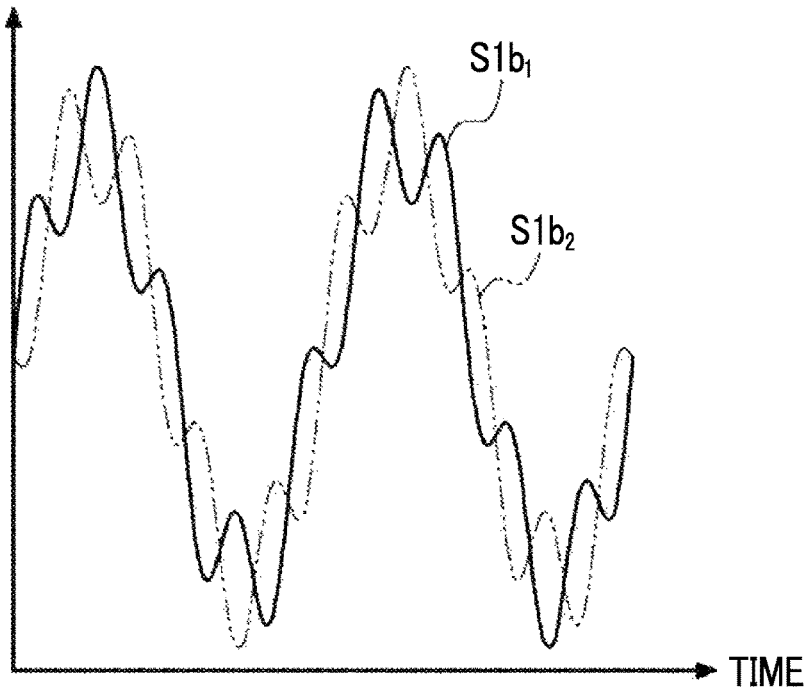
FIG. 9 is a diagram showing an example of first signal processing.
Figure 9:
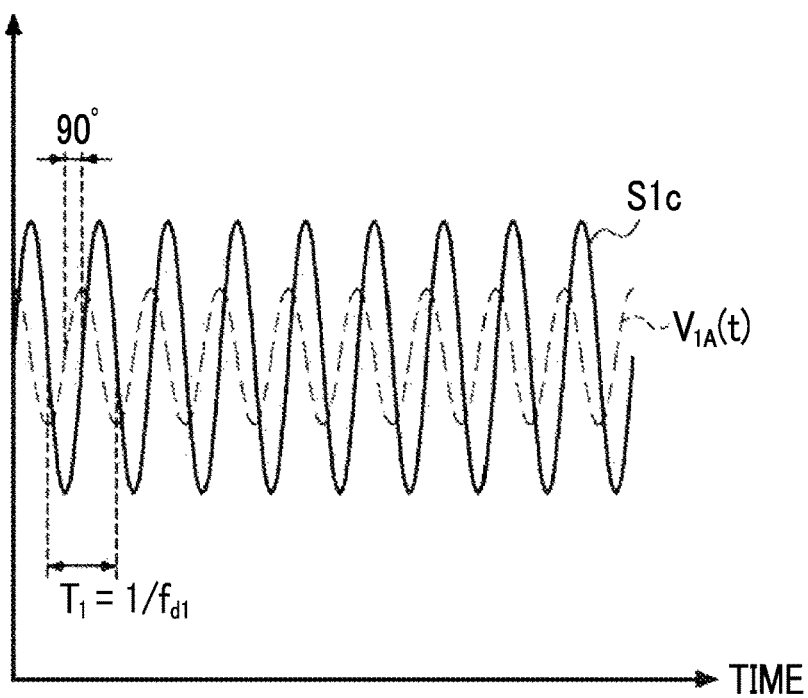

FIG. 9 shows a state where the first angle detection signal $S1c$ is generated based on $S1b_1$ and $S1b_2$ output from the pair of first angle detection sensors 11A and 11B. The first angle detection signal $S1c$ corresponds to a signal obtained by doubling an amplitude of the signal obtained by removing the vibration noise RN1 from the signal $S1b_1$.

In a case where the swing of the mirror portion 20 around the first axis $a_1$ maintains a resonance state, the first angle detection signal $S1c$ output from the first signal processing portion 61A has a delay of 900 in phase with respect to the driving voltage waveform $V_{1A}(t)$ included in the first driving signal as shown in FIG. 9.

The second signal processing portion 61B can be implemented by the same configuration as the first signal processing portion 61A and thus, will not be described.

Figure 10:
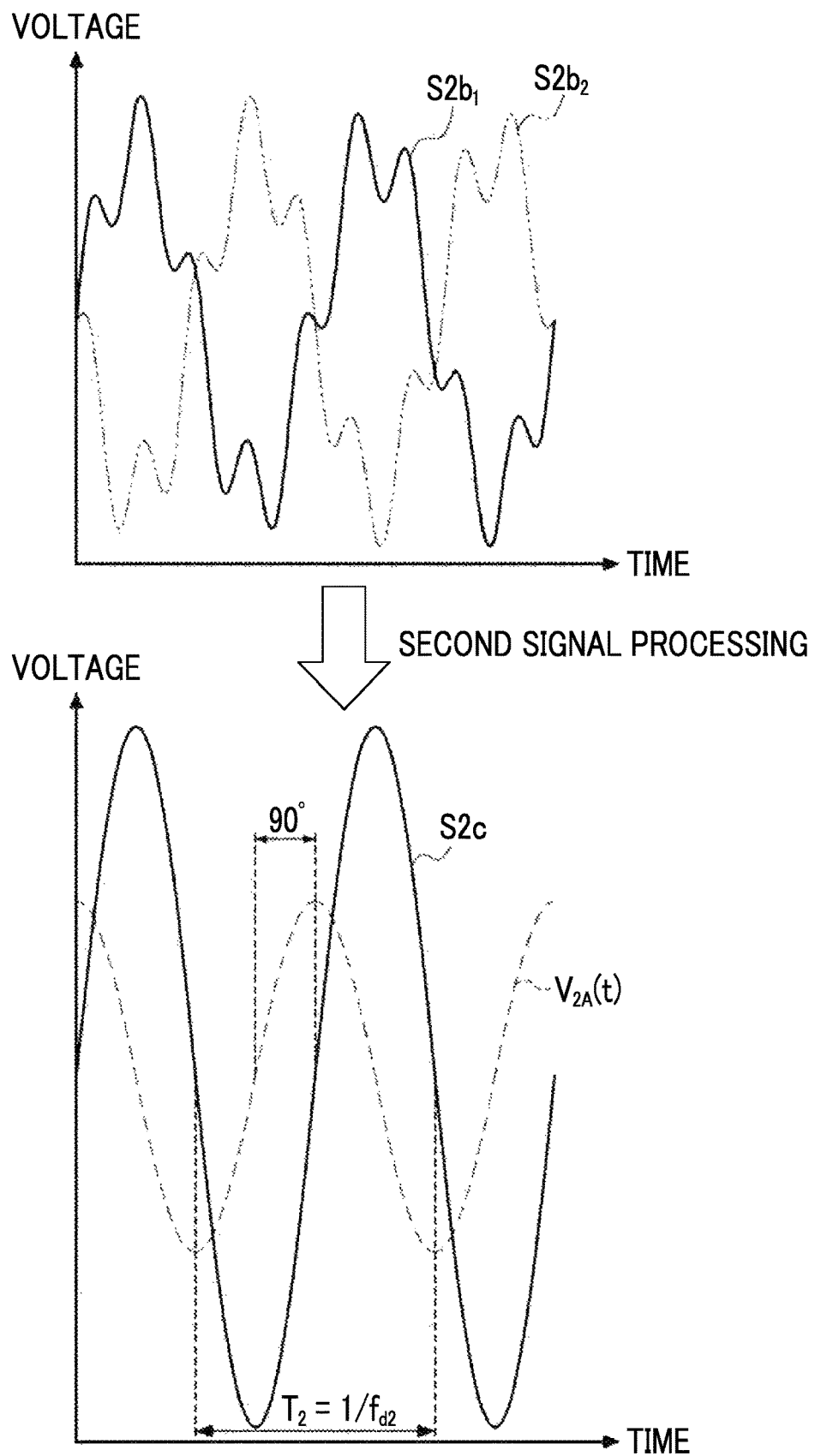
FIG. 10 is a diagram showing an example of second signal processing.

FIG. 10 shows a state where the second angle detection signal $S2c$ is generated based on $S2b_1$ and $S2b_2$ output from the pair of second angle detection sensors 12A and 12B. The second angle detection signal $S2c$ corresponds to a signal obtained by doubling an amplitude of the signal obtained by removing the vibration noise RN2 from the signal $S2b_1$.

In a case where the swing of the mirror portion 20 around the second axis $a_2$ maintains a resonance state, the second angle detection signal $S2c$ output from the second signal processing portion 61B has a delay of 900 in phase with respect to the driving voltage waveform $V_{2A}(t)$ included in the second driving signal as shown in FIG. 10.

The first angle detection signal $S1c$ generated by the first signal processing portion 61A is fed back to the first driving signal generation portion 60A. The first phase shift portion 62A shifts phases of the driving voltage waveforms output from the first driving signal generation portion 60A. For example, the first phase shift portion 62A shifts the phases by 90°. In addition, the first angle detection signal $S1c$ generated by the first signal processing portion 61A is input into the first zero cross pulse output portion 63A.

The second angle detection signal $S2c$ generated by the second signal processing portion 61B is fed back to the second driving signal generation portion 60B. The second phase shift portion 62B shifts phases of the driving voltage waveforms output from the second driving signal generation portion 60B. For example, the second phase shift portion 62B shifts the phases by 90°. In addition, the second angle detection signal $S2c$ generated by the second signal processing portion 61B is input into the second zero cross pulse output portion 63B.

The first zero cross pulse output portion 63A generates a zero cross pulse (hereinafter, referred to as a "first zero cross pulse") ZC1 based on the first angle detection signal $S1c$ input from the first signal processing portion 61A.

The first zero cross pulse output portion 63A is configured with a zero cross detection circuit.

Figure 11:
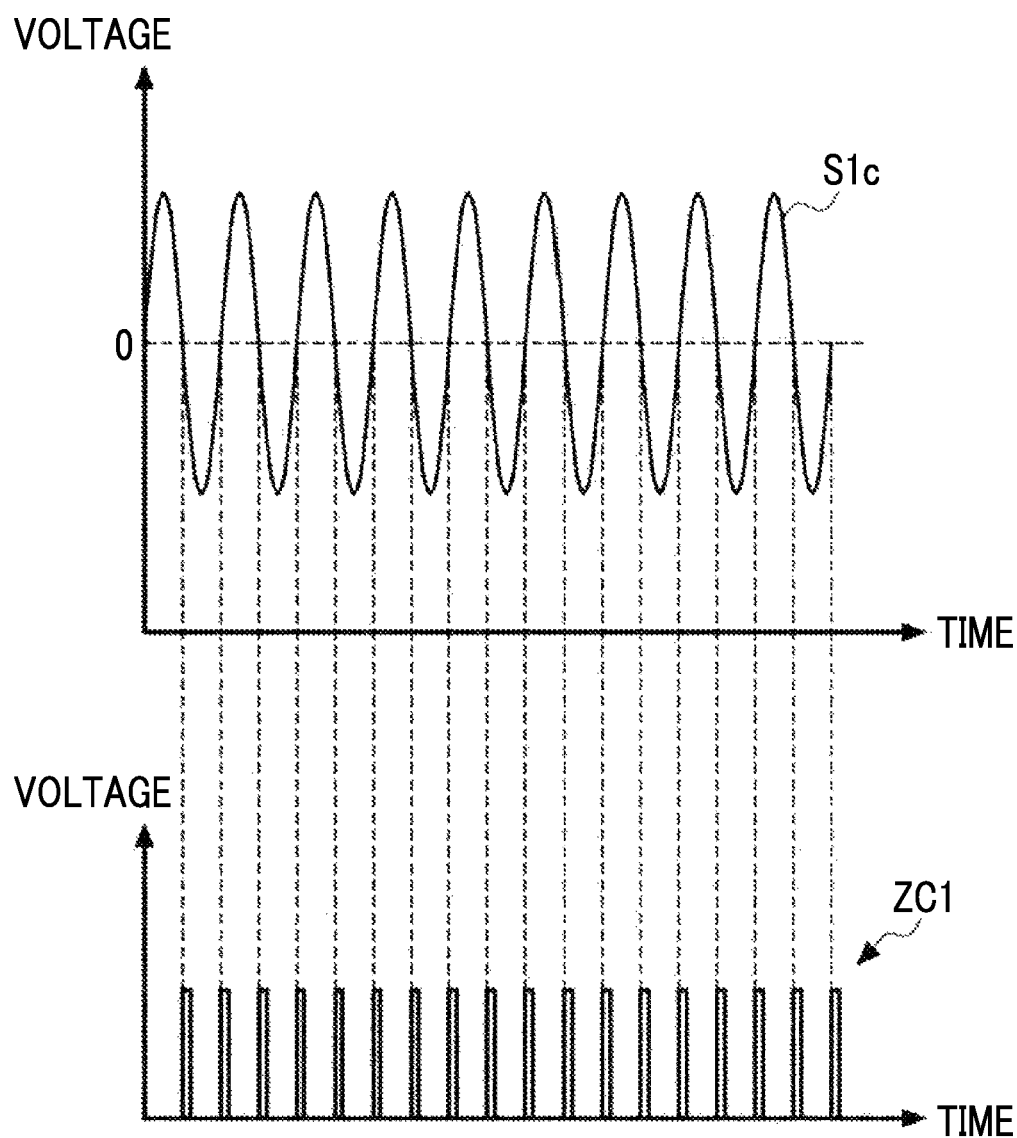
FIG. 11 is a diagram for describing processing of generating a first zero cross pulse.

As shown in FIG. 11, the first zero cross pulse output portion 63A generates the first zero cross pulse ZC1 at a timing at which the first angle detection signal $S1c$ that is an alternating current signal crosses zero volts. The first zero cross pulse output portion 63A inputs the generated first zero cross pulse ZC1 into the light source driving portion 66.

The second zero cross pulse output portion 63B generates a zero cross pulse (hereinafter, referred to as a "second zero cross pulse") ZC2 based on the second angle detection signal $S2c$ input from the second signal processing portion 61B.

The second zero cross pulse output portion 63B is configured with a zero cross detection circuit.

Figure 12:
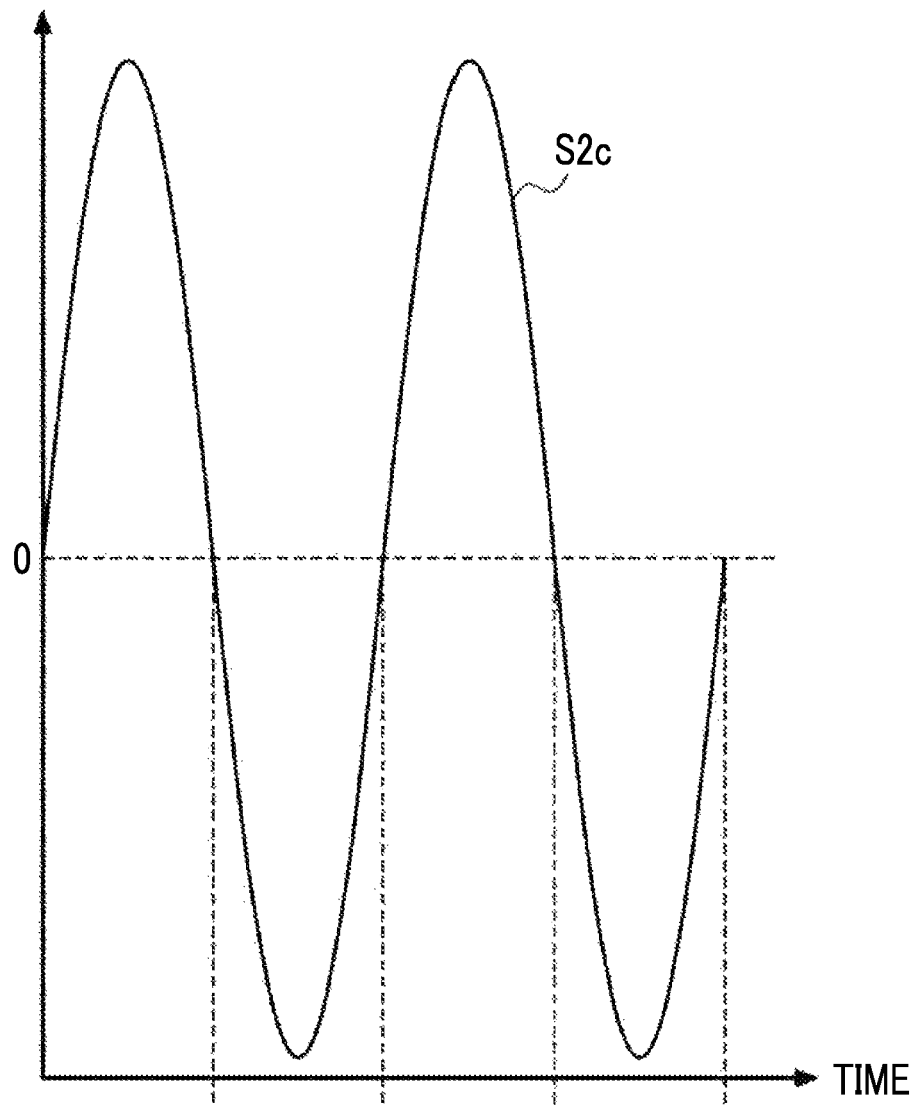
FIG. 12 is a diagram for describing processing of generating a second zero cross pulse.

As shown in FIG. 12, the second zero cross pulse output portion 63B generates the second zero cross pulse ZC2 at a timing at which the second angle detection signal $S2c$ that is an alternating current signal crosses zero volts. The second zero cross pulse output portion 63B inputs the generated second zero cross pulse ZC2 into the light source driving portion 66.

While the first zero cross pulse output portion 63A and the second zero cross pulse output portion 63B output the zero cross pulses using both of a point in time when the sinusoidal wave becomes zero from a negative value toward a positive value and a point in time when the sinusoidal wave becomes zero from a positive value toward a negative value, the present disclosure is not limited thereto. For example, the first zero cross pulse output portion 63A and the second zero cross pulse output portion 63B may output the zero cross pulses using any one of the point in time when the sinusoidal wave becomes zero from a negative value toward a positive value or the point in time when the sinusoidal wave becomes zero from a positive value toward a negative value.

The light source driving portion 66 drives the light source 3 based on, for example, drawing data supplied from an outside of the image drawing system 10. In addition, the light source driving portion 66 controls an irradiation timing of the laser light by the light source 3 so that the irradiation timing is synchronized with the first zero cross pulse ZC1 and with the second zero cross pulse ZC2.

As described above, the light source 3 is driven, and the mirror portion 20 swings around the first axis $a_1$ and around the second axis $a_2$ in accordance with initial set values of the first driving frequency $f_{d1}$, the second driving frequency $f_{d2}$, and the frequency ratio H between the first driving frequency $f_{d1}$ and the second driving frequency $f_{d2}$. Accordingly, the light beam L reflected by the mirror portion 20 is scanned onto the surface to be scanned 6 such that the light beam L draws a Lissajous waveform.

Figure 13:
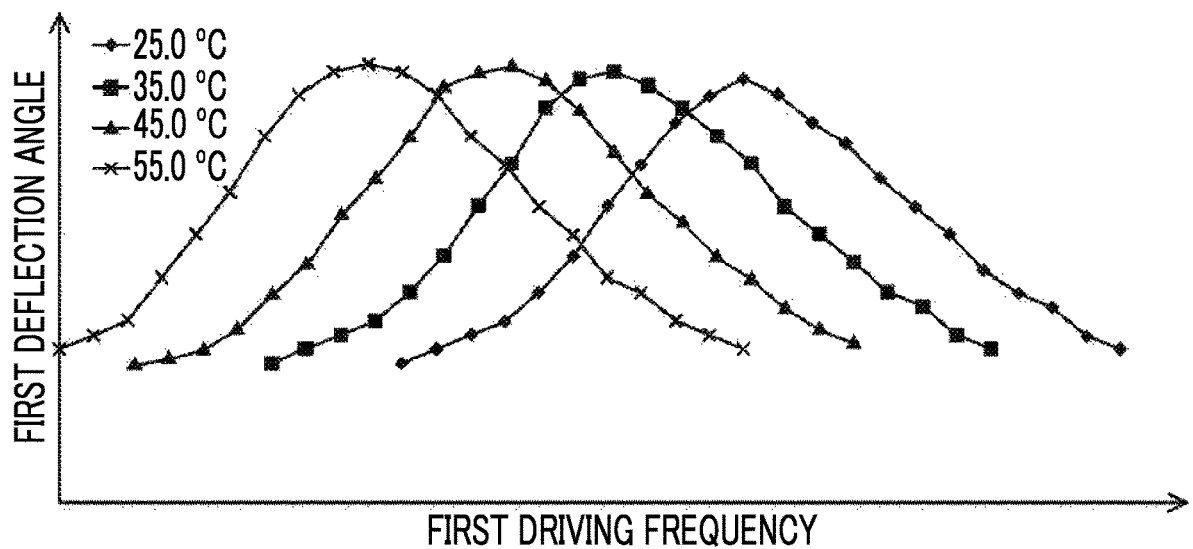
FIG. 13 is a graph showing an example of a relationship between a first driving frequency and a first deflection angle.
Figure 14:
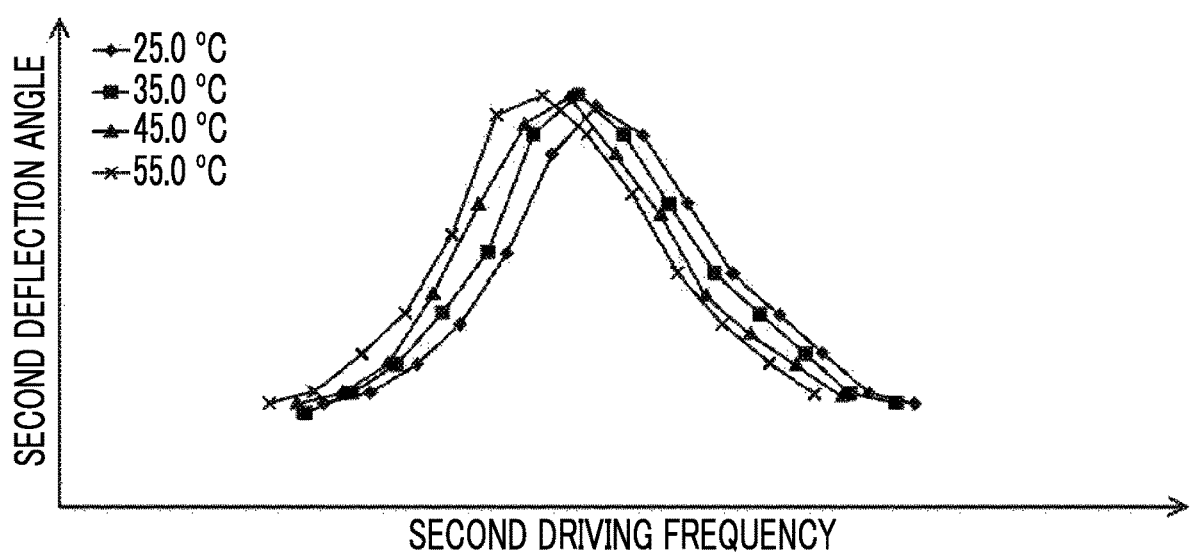
FIG. 14 is a graph showing an example of a relationship between a second driving frequency and a second deflection angle.

The resonance frequency of the mirror portion 20 around the first axis $a_1$ and the resonance frequency of the mirror portion 20 around the second axis $a_2$ may change depending on an environment condition. In the present embodiment, an example of applying an environment temperature as the environment condition will be described. FIG. 13 shows an example of a relationship between the first driving frequency $f_{d1}$ and the first deflection angle $\theta_1$ at each of four environment temperatures. As shown in FIG. 13, in a case where the environment temperature changes, the resonance frequency changes. Consequently, the first deflection angle θ₁ also changes. FIG. 14 shows an example of a relationship between the second driving frequency $f_{d2}$ and the second deflection angle θ₂ at each of four environment temperatures. As shown in FIG. 14, in a case where the environment temperature changes, the resonance frequency changes. Consequently, the second deflection angle θ₂ also changes.

Therefore, the optical scanning device 2 according to the present embodiment changes the first driving frequency $f_{d1}$ and the second driving frequency $f_{d2}$ in accordance with a change in the environment temperature. At this point, in a case where the frequency ratio H changes, the scanning density of the light on the surface to be scanned 6 also changes. Thus, the optical scanning device 2 changes the first driving frequency $f_{d1}$ and the second driving frequency $f_{d2}$ in a state where the frequency ratio H is maintained. Functions of the first driving signal generation portion 60A, the second driving signal generation portion 60B, the derivation portion 64, and the clock signal generation portion 65 in a case of changing the first driving frequency $f_{d1}$ and the second driving frequency $f_{d2}$ in a state where the frequency ratio H is maintained will be described. In the present embodiment, in order to implement these functions, information (hereinafter, referred to as "temperature characteristic information") representing the relationship between the first driving frequency $f_{d1}$ and the first deflection angle θ₁ for each environment temperature shown in FIG. 13 is stored in advance in a storage device such as a non-volatile memory comprised in the driving controller 5. The temperature characteristic information may be a look-up table in which the first driving frequency $f_{d1}$ is associated with the first deflection angle θ₁ for each environment temperature, or may be a function that, in a case where the environment temperature is input, outputs the first driving frequency $f_{d1}$ at which the first deflection angle θ₁ is the maximum.

In the present embodiment, a case where a direct digital synthesizer (DDS) is used for generating the first driving signal via the first driving signal generation portion 60A and for generating the second driving signal via the second driving signal generation portion 60B is illustrated. In addition, hereinafter, the first driving frequency $f_{d1}$ before change will be denoted by "$f_{d1A}$", and the first driving frequency $f_{d1}$ after change will be denoted by "$f_{d1}$ B". In addition, hereinafter, the second driving frequency $f_{d2}$ before change will be denoted by "$f_{d2A}$", and the second driving frequency $f_{d2}$ after change will be denoted by "$f_{d2B}$".

An output frequency of the DDS is represented by Expression (1) below.

$$f_{out} = \frac{M \times f_c}{2^N} \quad (1)$$

Here, $f_{out}$ is the output frequency of the DDS. In addition, fc is a system clock frequency. N is a length of a phase accumulator. M is a tuning word value. The system clock frequency and the length of the phase accumulator are known. Accordingly, the first driving signal generation portion 60A can generate the first driving signal having the first driving frequency $f_{d1}$ corresponding to the tuning word value M by setting the tuning word value M with which $f_{out}$ in Expression (1) results in the first driving frequency $f_{d1}$ as a target. In addition, the second driving signal generation portion 60B can generate the second driving signal having the second driving frequency $f_{d2}$ corresponding to the tuning word value M by setting the tuning word value M with which $f_{out}$ in Expression (1) results in the second driving frequency $f_{d2}$ as a target.

Hereinafter, the tuning word value M set in the DDS for generating the first driving signal will be denoted by "M1", and the tuning word value M set in the DDS for generating the second driving signal will be denoted by "M₂". The tuning word value M1 is an example of a first set value according to the embodiment of the technique of the disclosure, and $f_{d1}$ is proportional to M1. The tuning word value M₂ is an example of a second set value according to the embodiment of the technique of the disclosure, and $f_{d2}$ is proportional to M₂. In addition, hereinafter, the tuning word value M corresponding to the first driving frequency $f_{d1A}$ before change will be denoted by "$M_{1A}$", and the tuning word value M corresponding to the first driving frequency $f_{d1B}$ after change will be denoted by "M1₁". In addition, hereinafter, the tuning word value M corresponding to the second driving frequency $f_{d2A}$ before change will be denoted by "$M_{2A}$", and the tuning word value M corresponding to the second driving frequency $f_{d2}$B after change will be denoted by "$M_{2B}$".

The derivation portion 64 acquires the temperature detected by the temperature sensor 7 and determines whether or not to change the first driving frequency $f_{d1}$ and the second driving frequency $f_{d2}$ based on the acquired temperature. Specifically, for example, the derivation portion 64 determines to change the first driving frequency $f_{d1}$ and the second driving frequency $f_{d2}$ in a case where an absolute value of a difference between a temperature in a case where the tuning word value M₁ and the tuning word value M₂ are most recently set and the acquired temperature is greater than or equal to a constant value (for example, 1° C.).

In a case where it is determined to change the first driving frequency $f_{d1}$ and the second driving frequency $f_{d2}$, the derivation portion 64 derives a greatest common divisor G of $M_{1A}$ and $M_{2A}$. Next, the derivation portion 64 derives a first number Q1 that is a quotient obtained by dividing $M_{1A}$ by the greatest common divisor G. In addition, the derivation portion 64 derives a second number Q2 that is a quotient obtained by dividing $M_{2A}$ by the greatest common divisor G.

Figure 15:
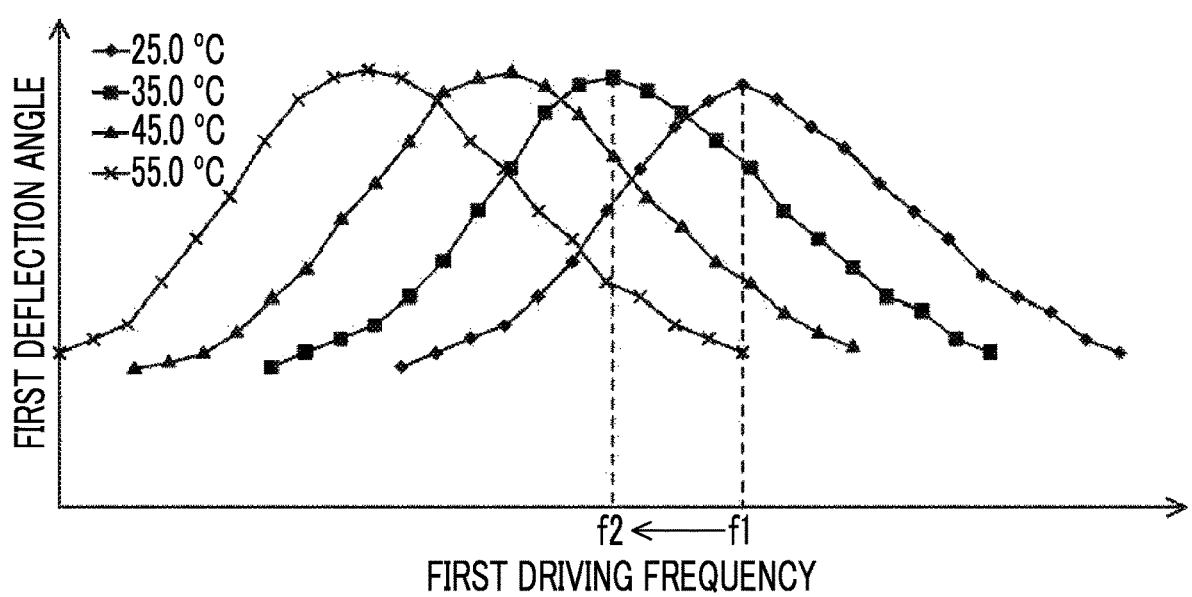
FIG. 15 is a diagram for describing processing of determining the first driving frequency as a target.

In addition, the derivation portion 64 determines the first driving frequency $f_{d1}$ as a target based on the acquired temperature and the temperature characteristic information. As shown in FIG. 15 as an example, in a case where the environment temperature changes from 25° C. to 35° C., the first driving frequency $f_{d1}$ as a target changes from f1 to f2. In such a manner, the derivation portion 64 sets, as the first driving frequency $f_{d1}$ as a target, the first driving frequency $f_{d1}$ with which the first deflection angle θ₁ results in a target angle (in the present embodiment, a maximum angle) in accordance with the acquired temperature.

The derivation portion 64 derives the tuning word value M1 with which the first driving frequency $f_{d1}$ as a target is obtained, in accordance with Expression (1). In addition, the derivation portion 64 determines n with which a value obtained by $M_{1A}$+n (n is an integer)×Q1 is closest to the derived tuning word value M1. The derivation portion 64 derives the tuning word value $M_{1B}$ in accordance with Expression (2) below.

$$M_{1B} = M_{1A} + n \times Q1 \quad (2)$$

That is, it can be said that $M_{1B}$ is a value obtained by changing $M_{1A}$ in units of the first number Q1.

In addition, the derivation portion 64 derives the tuning word value $M_{2B}$ in accordance with Expression (3) below.

$$M_{2B} = M_{2A} + n \times Q2 \quad (3)$$

That is, it can be said that $M_{2B}$ is a value obtained by changing $M_{2A}$ in units of the second number Q2.

Here, $f_{d1B}$ is obtained by substituting $M_{1B}$ for M in Expression (1), and $f_{d2B}$ is obtained by substituting $M_{2B}$ for M in Expression (1). Here, since $M_{1A} = G \times Q1$ and $M_{2A} = G \times Q2$ are established, the frequency ratio H between the first driving frequency $f_{d1}$ and the second driving frequency $f_{d2}$ before change is $f_{d2A}/f_{d1A} = M_{2A}/M_{1A} = (G \times Q2)/(G \times Q1) = Q2/Q1$. In addition, the frequency ratio H between the first driving frequency $f_{d1}$ and the second driving frequency $f_{d2}$ after change is $f_{d2B}/f_{d1B} = M_{2B}/M_{1B} = (M_{2A} + n \times Q2)/(M_{1A} + n \times Q1)$ $(G \times Q2 + n \times Q2)/(G \times Q1 + n \times Q1)$ $((G+n) \times Q2)/((G+n) \times Q1) = Q2/Q1$. In such a manner, by changing $M_{1A}$ in units of the first number Q1 and by changing $M_{2A}$ in units of the second number Q2, a ratio between $fd_{1B}$ and $f_{d2B}$ which is the frequency ratio H after change strictly matches a ratio between $f_{d1A}$ and $f_{d2A}$ which is the frequency ratio H before change.

Figure 16:
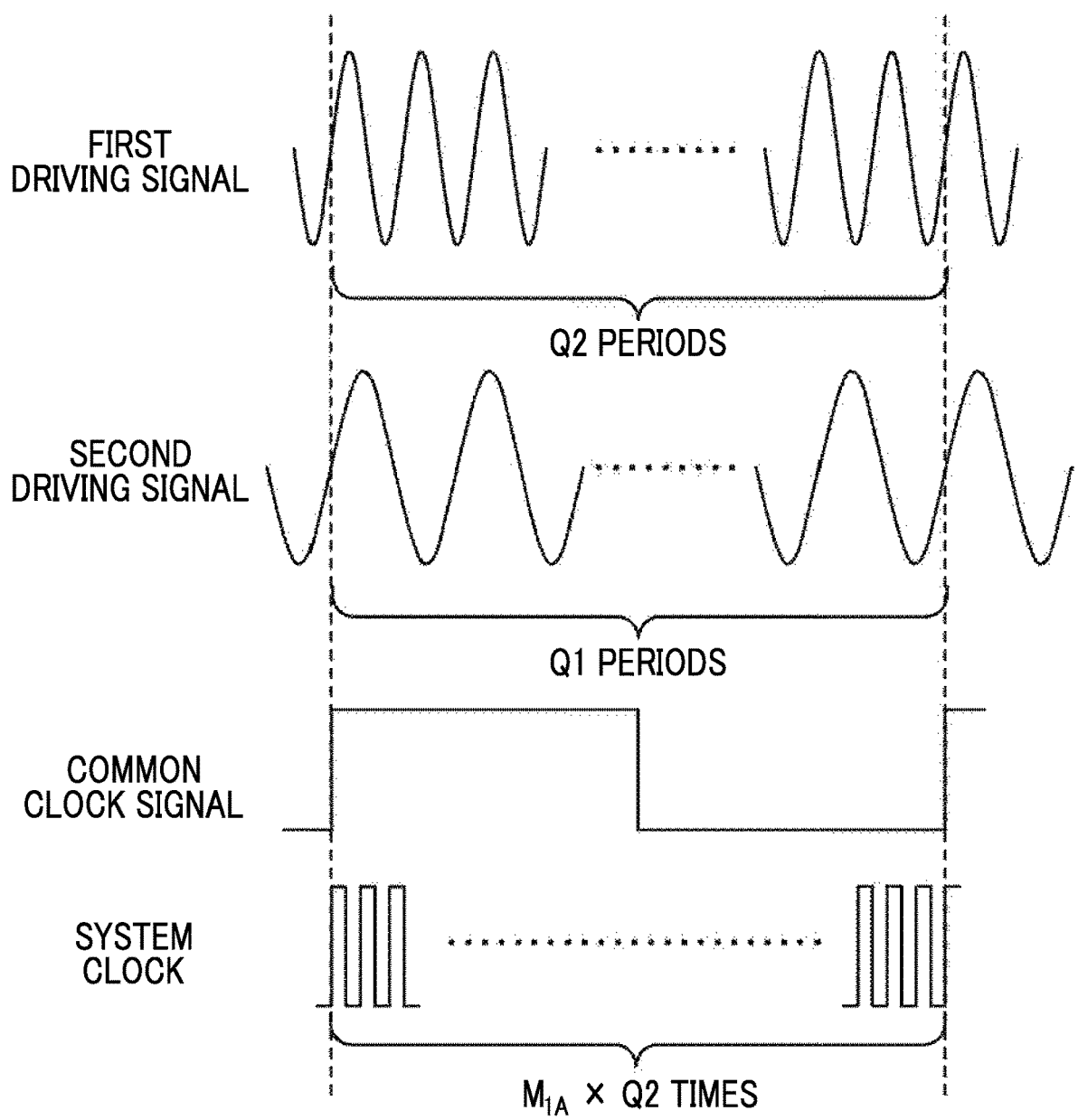
FIG. 16 is a diagram for describing a common clock signal.

The clock signal generation portion 65 generates a common clock signal used for changing the first driving frequency $f_{d1}$ via the first driving signal generation portion 60A and for changing the second driving frequency $f_{d2}$ via the second driving signal generation portion 60B. As shown in FIG. 16 as an example, the common clock signal is a clock signal in which a clock rises in accordance with a value obtained by multiplying $M_{1A}$ by Q2. Specifically, the common clock signal is a clock signal in which a clock rises each time a system clock rises ($M_{1A} \times Q2$) times. One period of the common clock signal corresponds to Q2 periods of the first driving signal and to Q1 periods of the second driving signal. A period of time corresponding to one period of the common clock signal may be a period of time of one frame in drawing a motion image.

Since $M_{1A} \times Q2 = M_{2A} \times Q1$ is established, the common clock signal may be a clock signal in which a clock rises each time the system clock rises ($M_{2A} \times Q1$) times.

The first driving signal generation portion 60A and the second driving signal generation portion 60B change the first driving frequency $f_{d1}$ and the second driving frequency $f_{d2}$ at the same timing based on the common clock signal generated by the clock signal generation portion 65.

Figure 17:
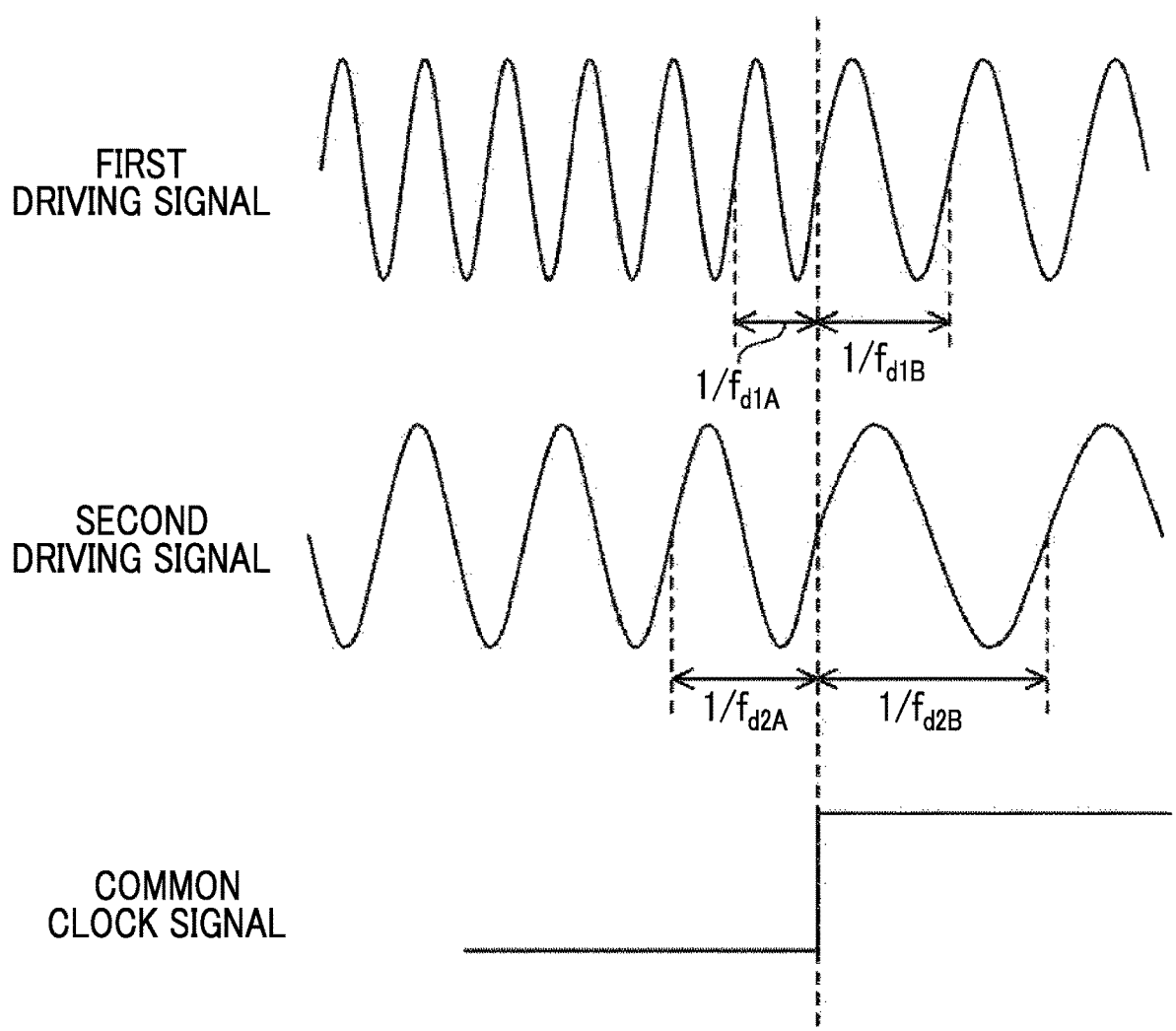
FIG. 17 is a diagram for describing a timing of change of the first driving frequency and the second driving frequency.

Specifically, as shown in FIG. 17 as an example, the first driving signal generation portion 60A changes the tuning word value M1 of the DDS to $M_{1B}$ derived by the derivation portion 64, at a timing when the clock of the common clock signal rises. Accordingly, the first driving signal generation portion 60A generates the first driving signal of which the first driving frequency $f_{d1}$ is changed to $f_{d1B}$, and provides the generated first driving signal to the pair of first actuators 31 through the first phase shift portion 62A.

In addition, as shown in FIG. 17, the second driving signal generation portion 60B changes the tuning word value $M_2$ of the DDS to $M_{2B}$ derived by the derivation portion 64, at a timing when the same clock as the clock used by the first driving signal generation portion 60A rises. Accordingly, the second driving signal generation portion 60B generates the second driving signal of which the second driving frequency $f_{d2}$ is changed to $f_{d2B}$, and provides the generated second driving signal to the pair of second actuators 32 through the second phase shift portion 62B.

In accordance with the changes of the first driving frequency $f_{d1}$ and the second driving frequency $f_{d2}$, the clock signal generated by the clock signal generation portion 65 may also be changed to a clock signal in which a clock rises each time the system clock rises ($M_{1B} \times Q2$) times. In this case, Q2 is a quotient obtained by dividing $M_{2B}$ by the greatest common divisor G of $M_{1B}$ and $M_{2B}$.

Next, a flow of driving frequency change processing will be described with reference to FIG. 18. For example, the flow of driving frequency change processing is executed during the drawing of the image by the image drawing system 10.

Figure 18:
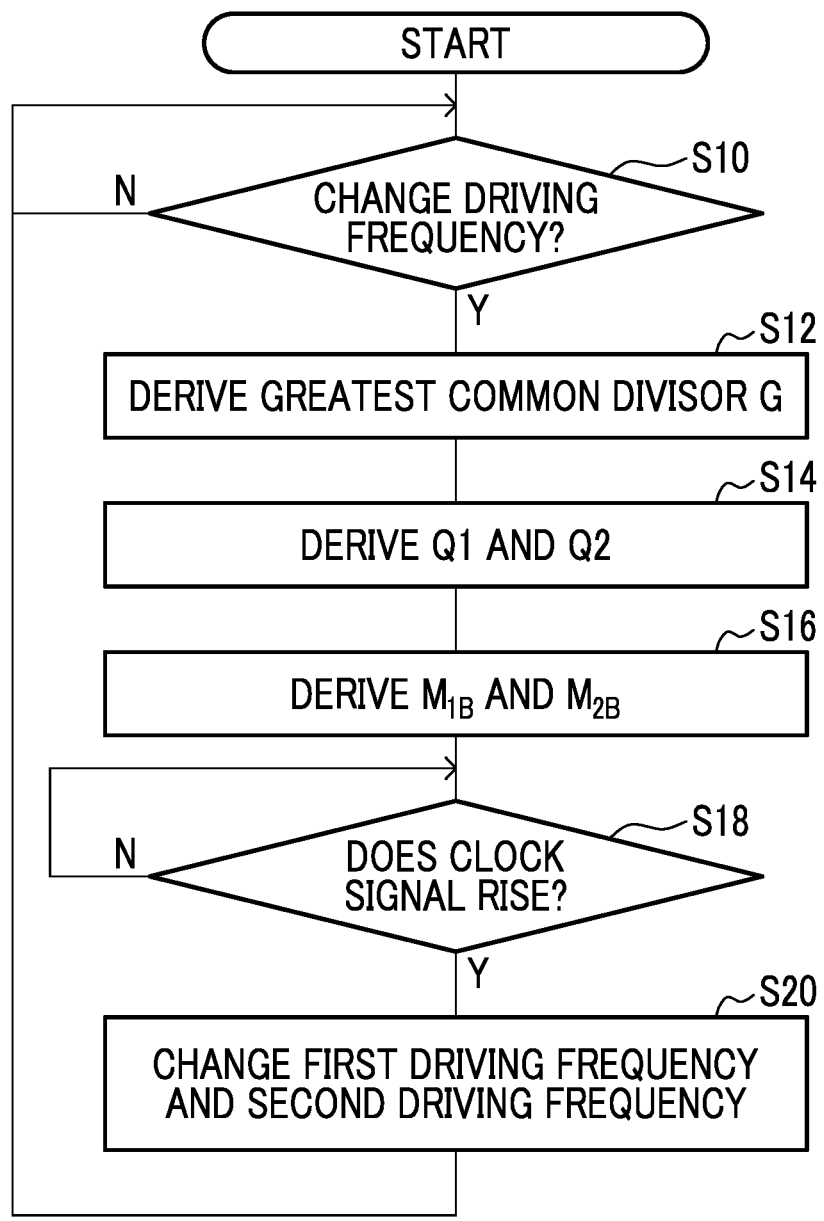
FIG. 18 is a flowchart showing an example of driving frequency change processing according to the first embodiment.

In step S10 in FIG. 18, as described above, the derivation portion 64 acquires the temperature detected by the temperature sensor 7 and determines whether or not to change the first driving frequency $f_{d1}$ and the second driving frequency $f_{d2}$ based on the acquired temperature. In a case where this determination results in a negative determination, step S10 is executed again. In a case of a positive determination, the processing transitions to step S12.

In step S12, the derivation portion 64 derives the greatest common divisor G of $M_{1A}$ and $M_{2A}$. In step S14, the derivation portion 64 derives the first number Q1 which is the quotient obtained by dividing $M_{1A}$ by the greatest common divisor G derived in step S12. In addition, the derivation portion 64 derives the second number Q2 which is the quotient obtained by dividing $M2_A$ by the greatest common divisor G derived in step S12.

In step S16, the derivation portion 64 determines the first driving frequency $f_{d1}$ as a target based on the temperature and the temperature characteristic information acquired in step S10. In addition, the derivation portion 64 derives the tuning word value M1 with which the first driving frequency $f_{d1}$ as a target is obtained, in accordance with Expression (1) above. In addition, the derivation portion 64 determines n with which a value obtained by $M_{1A} + n \times Q1$ is closest to the derived tuning word value M1. The derivation portion 64 derives the tuning word value $M_{1B}$ in accordance with Expression (2) above. In addition, the derivation portion 64 derives the tuning word value $M_{2B}$ in accordance with Expression (3) above.

In step S18, the first driving signal generation portion 60A and the second driving signal generation portion 60B wait until the common clock signal generated by the clock signal generation portion 65 rises. In a case where the common clock signal generated by the clock signal generation portion 65 rises, the determination in step S18 results in a positive determination, and the processing transitions to step S20.

In step S20, the first driving signal generation portion 60A changes the tuning word value $M_1$ of the DDS to $M_{1B}$ derived in step S16. Accordingly, the first driving signal generation portion 60A generates the first driving signal of which the first driving frequency $f_{d1}$ is changed to $f_{d1B}$, and provides the generated first driving signal to the pair of first actuators 31 through the first phase shift portion 62A. In addition, the second driving signal generation portion 60B changes the tuning word value $M_2$ of the DDS to $M_{2B}$ derived in step S16.

Accordingly, the second driving signal generation portion 60B generates the second driving signal of which the second driving frequency $f_{d2}$ is changed to $f_{d2B}$, and provides the generated second driving signal to the pair of second actuators 32 through the second phase shift portion 62B. In a case where the processing in step S20 is finished, the processing returns to step S10. In a case where processing of drawing the image via the image drawing system 10 is finished, the driving frequency change processing is finished.

As described above, according to the present embodiment, in a case of changing the first driving frequency $f_{d1}$ and the second driving frequency $f_{d2}$, the frequency ratio H between the first driving frequency $f_{d1}$ and the second driving frequency $f_{d2}$ can be strictly constantly maintained. In addition, since the first driving frequency $f_{d1}$ and the second driving frequency $f_{d2}$ are changed at the same timing, the phase difference φ between the first driving signal and the second driving signal can be maintained.

Figure 19:
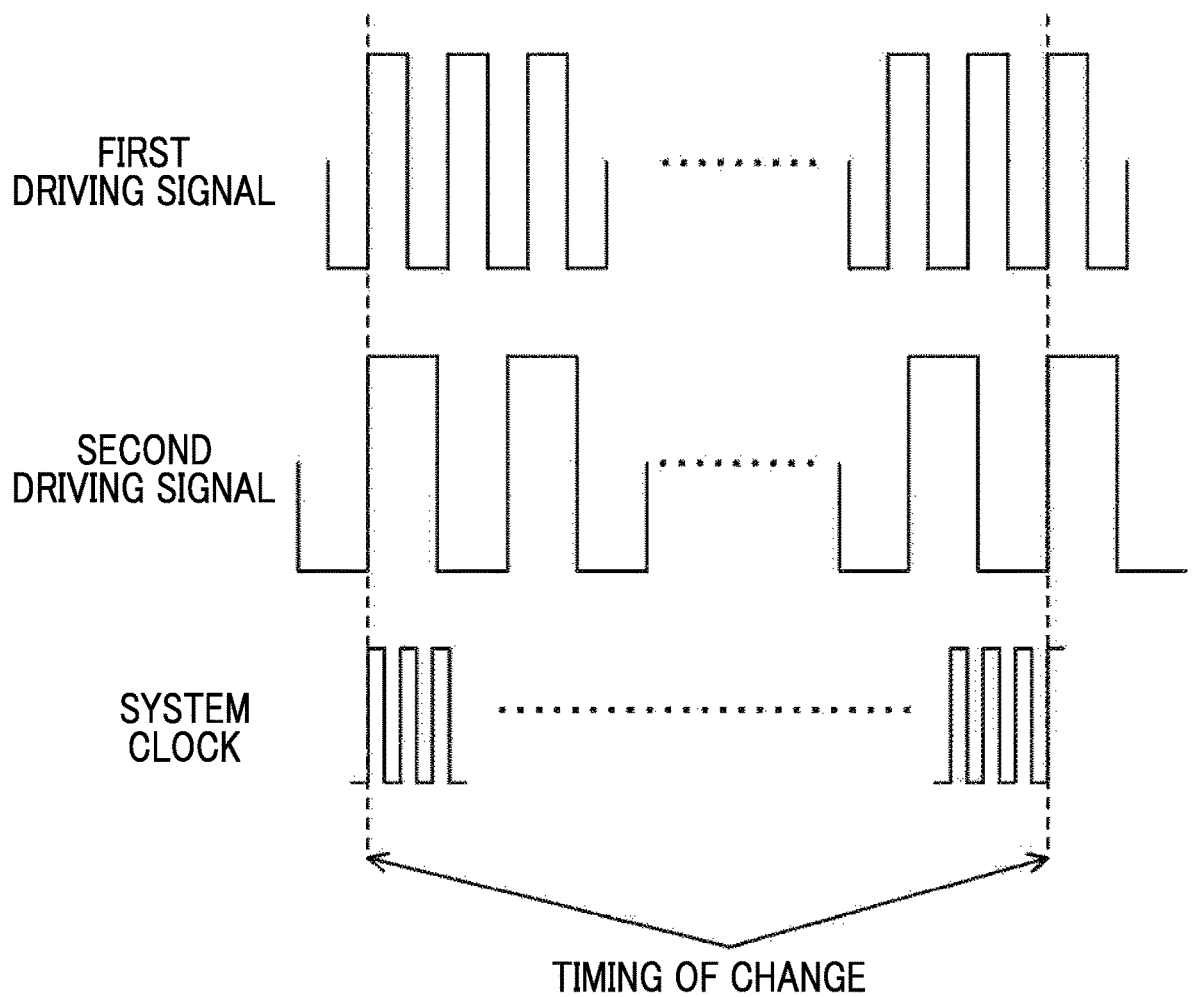
FIG. 19 is a diagram for describing a timing of change of the first driving frequency and the second driving frequency according to a modification example.

In the first embodiment, as shown in FIG. 19, the first driving signal generation portion 60A and the second driving signal generation portion 60B may change the first driving frequency $f_{d1}$ and the second driving frequency $f_{d2}$ at a timing that is the same as a timing when each of the first driving signal and the second driving signal that are binarized rises, and that is a timing when the system clock rises. In this case, the system clock is the common clock signal. In addition, in this case, the clock signal generation portion 65 in the first embodiment is not necessary.

Second Embodiment

A second embodiment of the technique of the disclosure will be described. A configuration (see FIG. 1) of the image drawing system 10 and a configuration (see FIG. 2) of the MMD 4 according to the present embodiment are the same as in the first embodiment and thus, will not be described.

Figure 20:
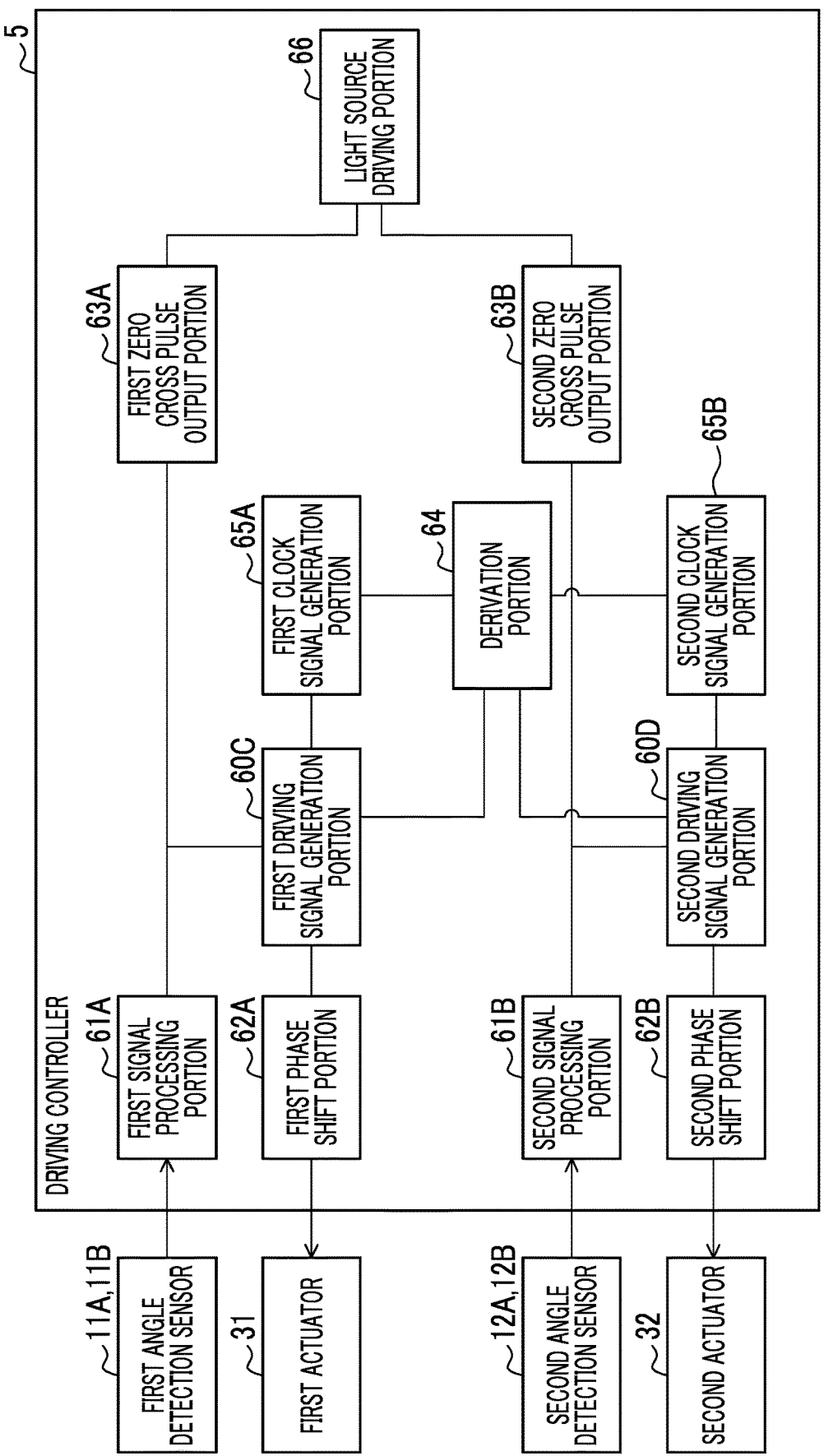
FIG. 20 is a block diagram showing an example of a functional configuration of a driving controller according to a second embodiment.

A functional configuration of the driving controller 5 according to the present embodiment will be described with reference to FIG. 20.

Functional portions having the same functions as the first embodiment will be designated by the same reference numerals as the first embodiment and will not be described. The driving controller 5 includes a first driving signal generation portion 60C, a second driving signal generation portion 60D, the first signal processing portion 61A, the second signal processing portion 61B, the first phase shift portion 62A, the second phase shift portion 62B, the first zero cross pulse output portion 63A, the second zero cross pulse output portion 63B, the derivation portion 64, a first clock signal generation portion 65A, a second clock signal generation portion 65B, and the light source driving portion 66.

Figure 21:
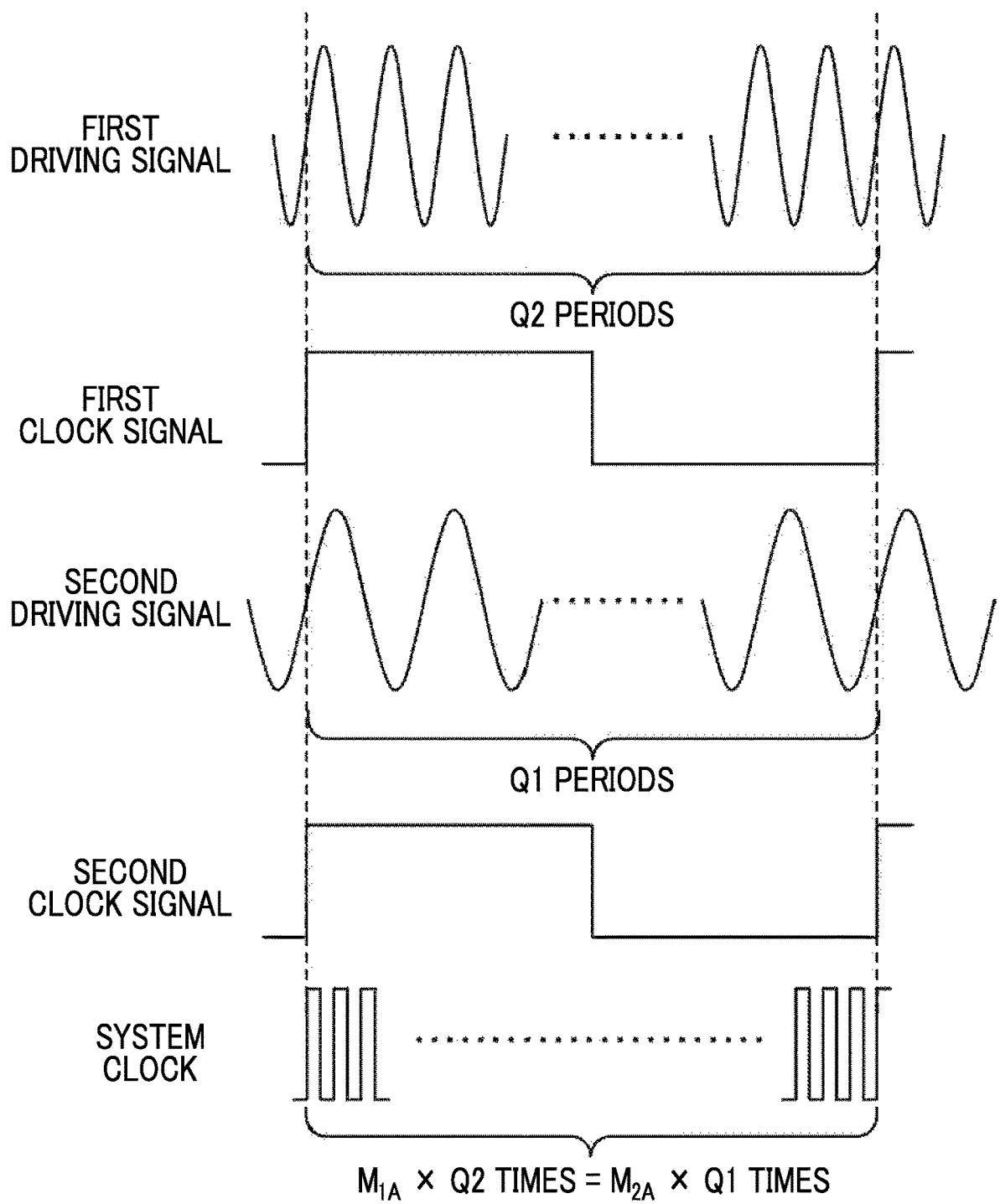
FIG. 21 is a diagram for describing a first clock signal and a second clock signal.

The first clock signal generation portion 65A generates the first clock signal in which a clock rises in accordance with a value obtained by multiplying $M_{1A}$ by Q2. Specifically, as shown in FIG. 21 as an example, the first clock signal generation portion 65A generates the first clock signal in which a clock rises each time the system clock rises ($M_{1A}$×Q2) times.

The second clock signal generation portion 65B generates the second clock signal in which a clock rises in accordance with a value obtained by multiplying $M_{2A}$ by Q1. Specifically, as shown in FIG. 21 as an example, the second clock signal generation portion 65B generates the second clock signal in which a clock rises each time the system clock rises ($M_{2A}$×Q1) times.

In the present embodiment, a case where there is a phase difference between the first clock signal and the second clock signal will be described. This phase difference is equal to the phase difference between the first driving signal and the second driving signal and thus, will be denoted by "φ". An initial value of the phase difference y is set in accordance with a phase difference between the first angle detection signal S1c and the second angle detection signal S2c. Hereinafter, the phase difference φ between the first driving frequency $f_{d1}$ and the second driving frequency $f_{d2}$ before change will be denoted by "$φ_{c1}$", and the phase difference φ after change will be denoted by "$φ_{c2}$".

Figure 22:
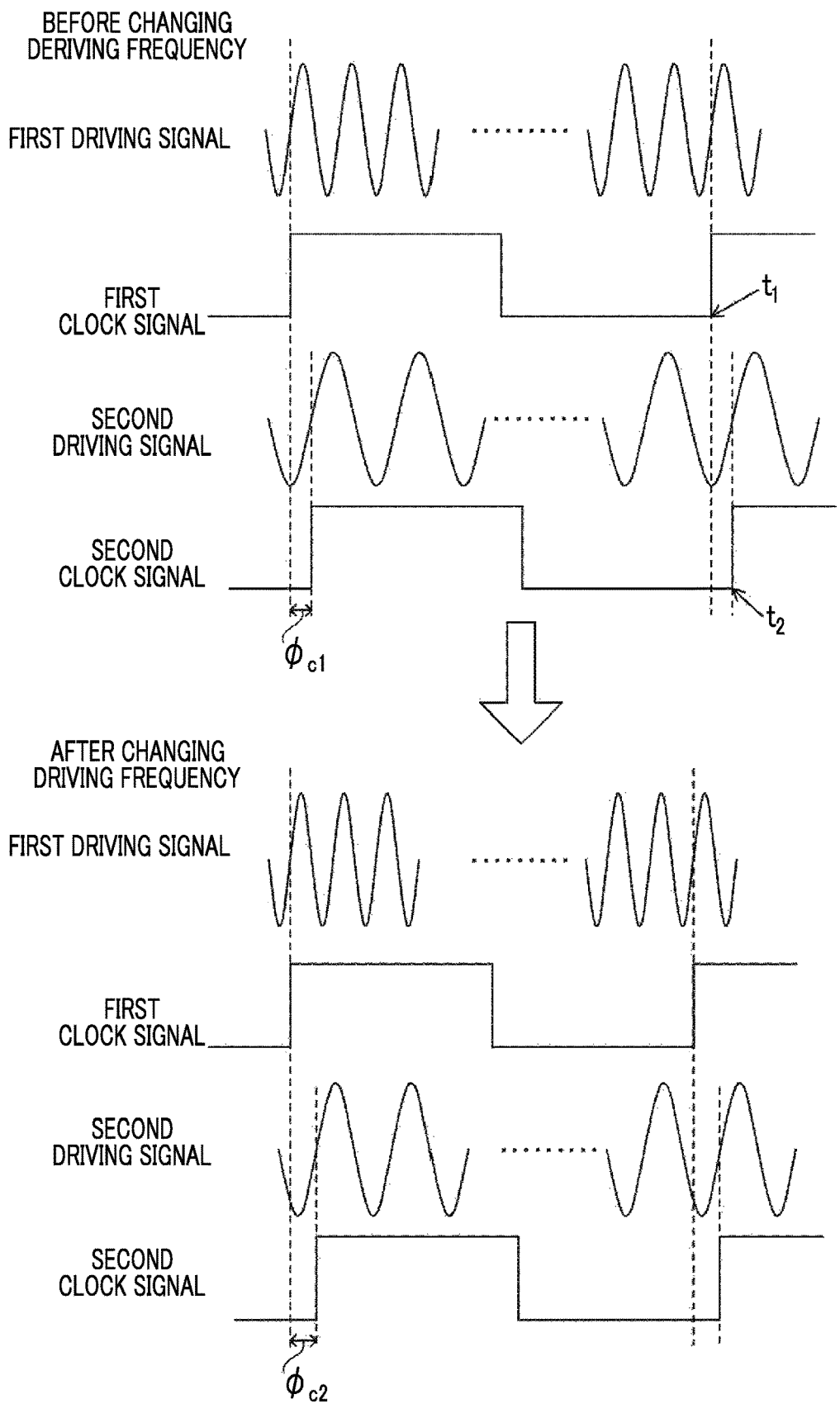
FIG. 22 is a diagram for describing processing of changing a phase difference between the first clock signal and the second clock signal.

As shown in FIG. 22, at the same timing as a timing of change of the first driving frequency $f_{d1}$ and the second driving frequency $f_{d2}$, the second clock signal generation portion 65B changes $φ_{c1}$ to the phase difference $φ_{c2}$ obtained by multiplying $φ_{c1}$ by a ratio of $f_{d1A}$ to $f_{d1B}$ in accordance with Expression (4) below.

$$\varphi_{c2} = \varphi_{c1} \times \frac{f_{d1A}}{f_{d1B}} \quad (4)$$

In addition, the first clock signal generation portion 65A changes the tuning word value $M_1$ and the second number Q2 to values corresponding to $f_{d1B}$ and to $f_{d2B}$ at the same timing as the timing of change of the first driving frequency $f_{d1}$, and generates the first clock signal in which a clock rises in accordance with a value obtained by multiplying $M_{1B}$ by Q2 after change.

In addition, the second clock signal generation portion 65B changes the tuning word value $M_2$ and the first number Q1 to values corresponding to $f_{d1B}$ and to $f_{d2B}$ at the same timing as the timing of change of the second driving frequency $f_{d2}$, and generates the second clock signal in which a clock rises in accordance with a value obtained by multiplying $M_{2B}$ by Q1 after change.

Functions of the first driving signal generation portion 60C other than a function in a case of changing the first driving frequency $f_{d1}$ are the same as the functions of the first driving signal generation portion 60A according to the first embodiment. Thus, the function in a case of changing the first driving frequency $f_{d1}$ will be described here.

The first driving signal generation portion 60C changes the tuning word value $M_1$ of the DDS to $M_{1B}$ derived by the derivation portion 64 at a timing when the clock of the first clock signal generated by the first clock signal generation portion 65A rises. Accordingly, the first driving signal generation portion 60C generates the first driving signal of which the first driving frequency $f_{d1}$ is changed to $f_{d1B}$, and provides the generated first driving signal to the pair of first actuators 31 through the first phase shift portion 62A.

This timing of change of the first driving frequency $f_{d1}$ is shown by, for example, $t_1$ in the upper part of FIG. 22.

Functions of the second driving signal generation portion 60D other than a function in a case of changing the second driving frequency $f_{d2}$ are the same as the functions of the second driving signal generation portion 60B according to the first embodiment. Thus, the function in a case of changing the second driving frequency $f_{d2}$ will be described here.

The second driving signal generation portion 60D changes the tuning word value $M_2$ of the DDS to $M_{2B}$ derived by the derivation portion 64 at a timing when the clock of the second clock signal generated by the second clock signal generation portion 65B rises. Accordingly, the second driving signal generation portion 60D generates the second driving signal of which the second driving frequency $f_{d2}$ is changed to $f_{d2B}$, and provides the generated second driving signal to the pair of second actuators 32 through the second phase shift portion 62B.

This timing of change of the second driving frequency $f_{d2}$ is shown by, for example, $t_2$ in the upper part of FIG. 22.

Next, a flow of driving frequency change processing according to the present embodiment will be described with reference to FIG. 23. For example, the flow of driving frequency change processing is executed during the drawing of the image by the image drawing system 10. Steps in FIG.

23 for executing the same processing as FIG. 18 will be designated by the same step numbers and will not be described.

Figure 23:
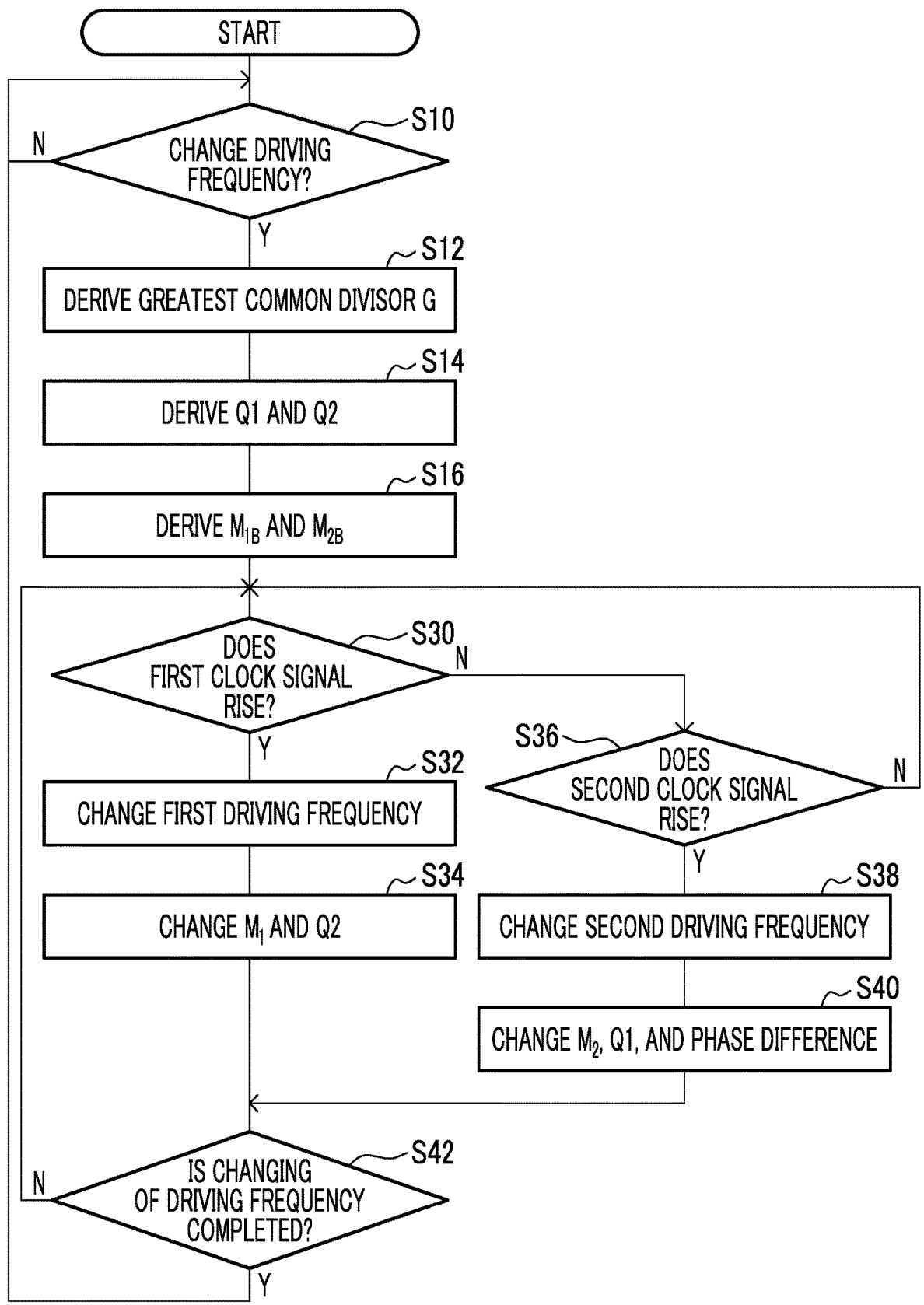
FIG. 23 is a flowchart showing an example of driving frequency change processing according to the second embodiment.

In a case where the processing in step S16 in FIG. 23 is finished, the processing transitions to step S30. In step S30, the first driving signal generation portion 60C determines whether or not a timing when the clock of the first clock signal generated by the first clock signal generation portion 65A rises is reached. In a case where this determination results in a positive determination, the processing transitions to step S32.

In step S32, the first driving signal generation portion 60C changes the tuning word value $M_1$ of the DDS to $M_{1B}$ derived in step S16. Accordingly, the first driving signal generation portion 60C generates the first driving signal of which the first driving frequency $f_{d1}$ is changed to $f_{d1B}$, and provides the generated first driving signal to the pair of first actuators 31 through the first phase shift portion 62A.

In step S34, the first clock signal generation portion 65A changes the tuning word value $M_1$ and the second number Q2 to values corresponding to $f_{d1B}$ and to $f_{d2B}$ and generates the first clock signal in which a clock rises in accordance with a value obtained by multiplying $M_{1B}$ by Q2 after change. In a case where the processing in step S34 is finished, the processing transitions to step S42.

On the other hand, in a case where the determination in step S30 results in a negative determination, the processing transitions to step S36. In step S36, the second driving signal generation portion 60D determines whether or not a timing when the clock of the second clock signal generated by the second clock signal generation portion 65B rises is reached. In a case where this determination results in a negative determination, the processing returns to step S30. In a case of a positive determination, the processing transitions to step S38.

In step S38, the second driving signal generation portion 60D changes the tuning word value $M_2$ of the DDS to $M_{2B}$ derived in step S16. Accordingly, the second driving signal generation portion 60D generates the second driving signal of which the second driving frequency $f_{d2}$ is changed to $f_{d2B}$, and provides the generated second driving signal to the pair of second actuators 32 through the second phase shift portion 62B.

In step S40, the second clock signal generation portion 65B changes the tuning word value $M_2$ and the first number Q1 to values corresponding to $f_{d1B}$ and to $f_{d2B}$ and generates the second clock signal in which a clock rises in accordance with a value obtained by multiplying $M_{2B}$ by Q1 after change. At this point, as described above, the second clock signal generation portion 65B changes $\varphi_{c1}$ to the phase difference $\varphi_{c2}$ obtained by multiplying $\varphi_{c1}$ by the ratio of $f_{d1A}$ to $f_{d1B}$ in accordance with Expression (4) above.

In a case where the processing in step S40 is finished, the processing transitions to step S42.

In step S42, the derivation portion 64 determines whether or not changing of the first driving frequency $f_{d1}$ and the second driving frequency $f_{d2}$ is completed. In a case where this determination results in a negative determination, the processing returns to step S30. In a case of a positive determination, the processing returns to step S10. In a case where the processing of drawing the image via the image drawing system 10 is finished, the driving frequency change processing is finished.

As described above, according to the present embodiment, the same effect as the first embodiment can be achieved. In addition, in the present embodiment, even in a case where the first driving frequency $f_{d1}$ and the second driving frequency $f_{d2}$ are changed based on different clock signals, the phase difference y between the first driving signal and the second driving signal can be maintained.

While a case of determining the first driving frequency $f_{d1}$ and then, determining the second driving frequency $f_{d2}$ based on the first driving frequency $f_{d1}$ and on the frequency ratio H is described in each embodiment, the present disclosure is not limited thereto. The present disclosure may also be embodied in the form of determining the second driving frequency $f_{d2}$ and then, determining the first driving frequency $f_{d1}$ based on the second driving frequency $f_{d2}$ and on the frequency ratio H.

In addition, the configuration of the MMD 4 shown in each embodiment is an example. The configuration of the MMD 4 can be variously modified. For example, the first actuators 31 that cause the mirror portion 20 to swing around the first axis $a_1$ may be arranged in the second movable frame 24, and the second actuators 32 that cause the mirror portion 20 to swing around the second axis $a_2$ may be arranged in the first movable frame 22.

In addition, in each embodiment, while a case where the pair of first angle detection sensors 11A and 11B are arranged at positions that face each other with the first axis $a_1$ interposed therebetween is described, the present disclosure is not limited thereto.

Figure 24:
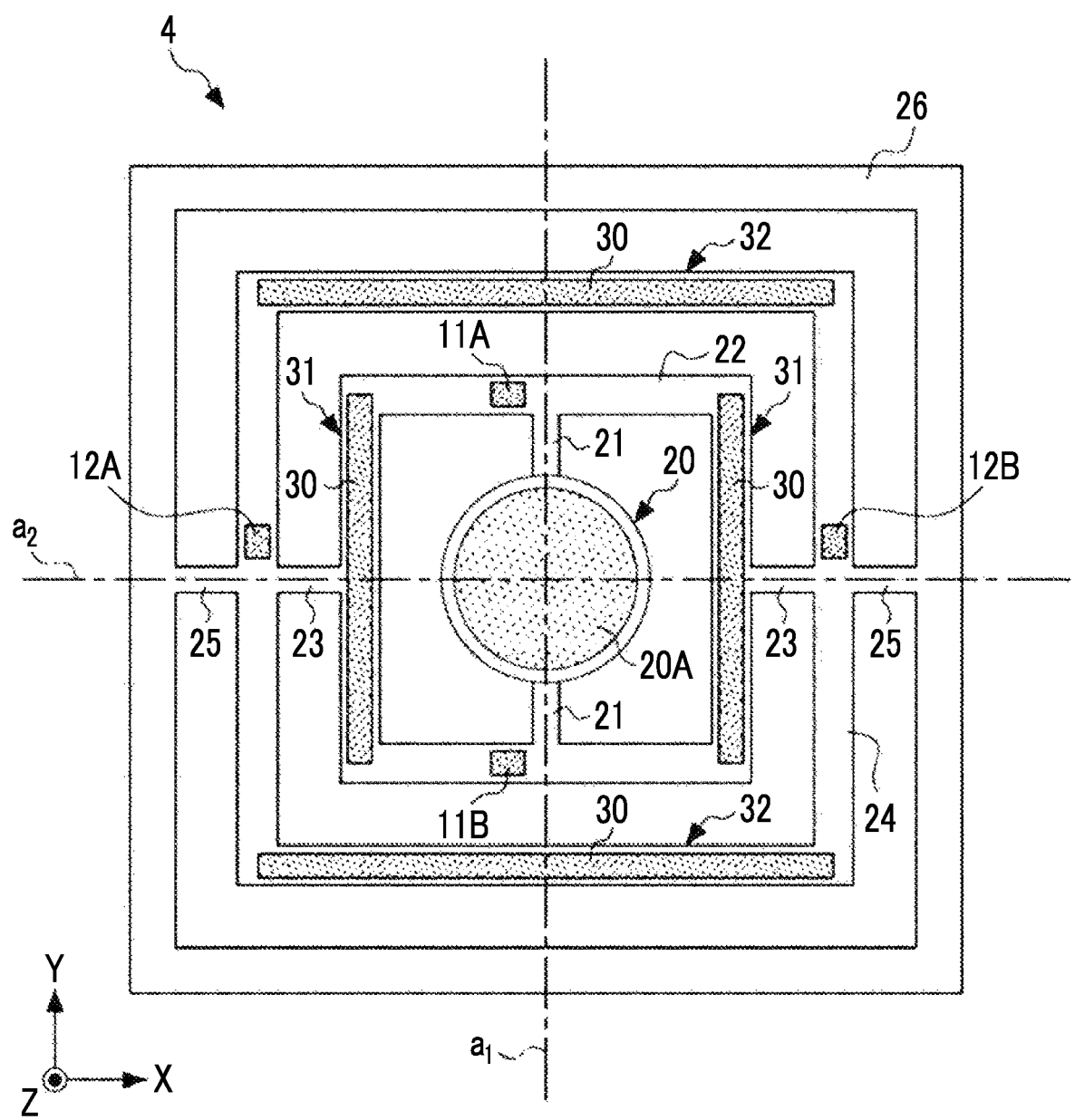
FIG. 24 is a plan view of a micromirror device according to the modification example.

For example, as shown in FIG. 24, the pair of first angle detection sensors 11A and 11B may be arranged at positions that face each other with the second axis $a_2$ interposed therebetween. In the example in FIG. 24, each of the pair of first angle detection sensors 11A and 11B is arranged near the first support portions 21 on the first movable frame 22. The first angle detection sensor 11A is arranged near the first support portion 21 connected to one side of the mirror portion 20. The first angle detection sensor 11B is arranged near the first support portion 21 connected to the other side of the mirror portion 20. Accordingly, the pair of first angle detection sensors 11A and 11B are arranged at positions that face each other with the second axis $a_2$ interposed therebetween and that face each other with the mirror portion 20 interposed therebetween. In addition, the pair of first angle detection sensors 11A and 11B are arranged at positions that are shifted in the same direction (in the example in FIG. 24, the $-X$ direction) from the first axis $a_1$.

As in each embodiment, in a case where the pair of first angle detection sensors 11A and 11B are arranged at positions that face each other with the first axis $a_1$ interposed therebetween, the vibration noises can be removed by subtracting one of the output signals of both of the first angle detection sensors 11A and 11B from the other. On the other hand, as in this form example, in a case where the pair of first angle detection sensors 11A and 11B are arranged at positions that face each other with the second axis $a_2$ interposed therebetween, the vibration noises can be removed by adding the output signals of both of the first angle detection sensors 11A and 11B.

Figure 25:
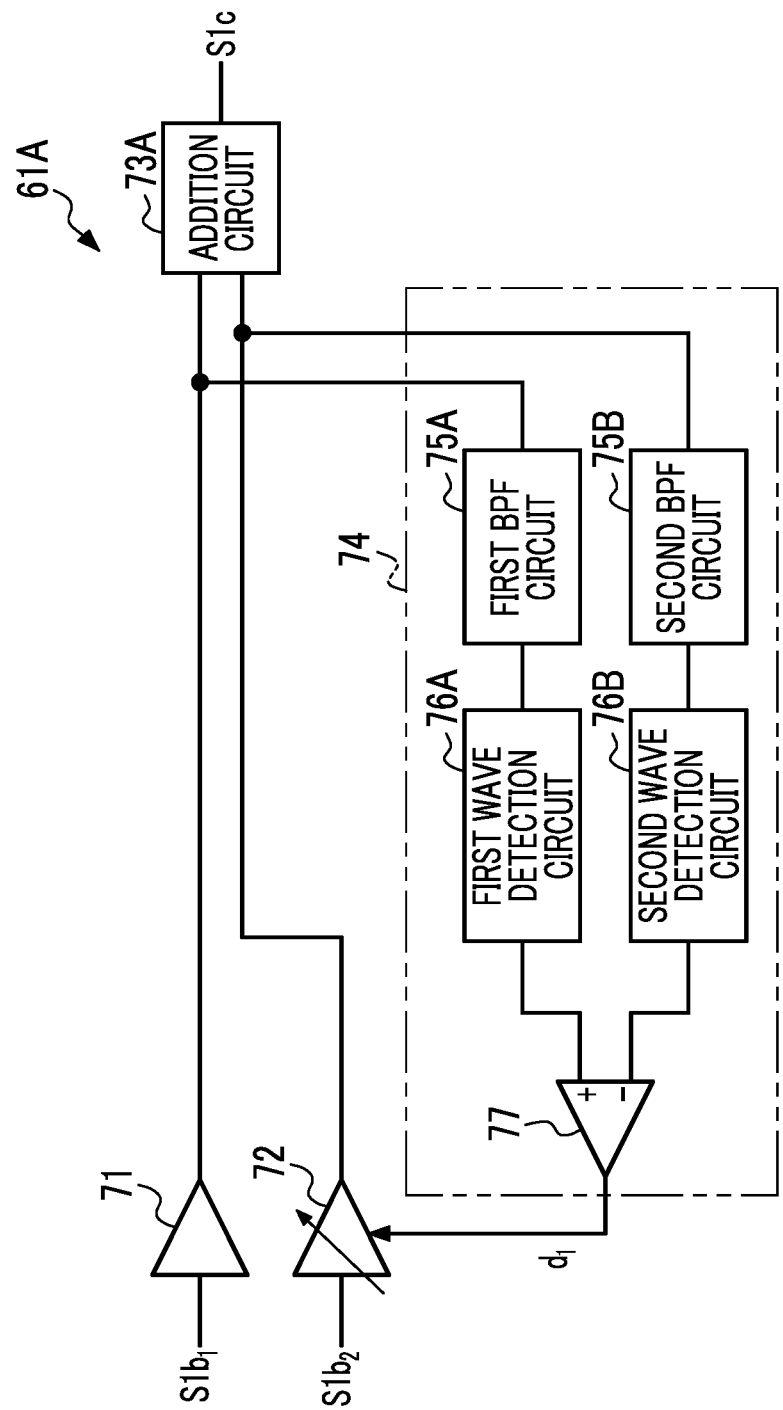
FIG. 25 is a circuit diagram showing a configuration of a first signal processing portion according to the modification example.

An example of a configuration of the first signal processing portion 61A in this form example is shown in FIG. 25. As shown in FIG. 25, in this form example, the first signal processing portion 61A includes an addition circuit 73A instead of the subtraction circuit 73. The addition circuit 73A outputs a value obtained by adding the signal $S1b_1$ input from the first angle detection sensor 11A through the buffer amplifier 71 to the signal $S1b_2$ input from the first angle detection sensor 11B through the variable gain amplifier 72.

In addition, in each embodiment, while a case where the pair of second angle detection sensors 12A and 12B are arranged at positions that face each other with the second axis $a_2$ interposed therebetween is described, the present disclosure is not limited thereto. For example, as shown in FIG. 24, the pair of second angle detection sensors 12A and 12B may be arranged at positions that face each other with the first axis $a_1$ interposed therebetween. In the example in FIG. 24, each of the pair of second angle detection sensors 12A and 12B is arranged near the second support portions 23 on the second movable frame 24. The second angle detection sensor 12A is arranged near the second support portion 23 connected to one side of the first movable frame 22. The second angle detection sensor 12B is arranged near the second support portion 23 connected to the other side of the first movable frame 22. Accordingly, the pair of second angle detection sensors 12A and 12B are arranged at positions that face each other with the first axis $a_1$ interposed therebetween and that face each other with the mirror portion 20 and the first movable frame 22 interposed therebetween. In addition, the pair of second angle detection sensors 12A and 12B are arranged at positions that are shifted in the same direction (in the example in FIG. 24, the +Y direction) from the second axis $a_2$.

As in each embodiment, in a case where the pair of second angle detection sensors 12A and 12B are arranged at positions that face each other with the second axis $a_2$ interposed therebetween, the vibration noises can be removed by subtracting one of the output signals of both of the second angle detection sensors 12A and 12B from the other. On the other hand, as in this form example, in a case where the pair of second angle detection sensors 12A and 12B are arranged at positions that face each other with the first axis $a_1$ interposed therebetween, the vibration noises can be removed by adding the output signals of both of the second angle detection sensors 12A and 12B. A configuration of the second signal processing portion 61B in this form example can be implemented by the same configuration as the first signal processing portion 61A shown in FIG. 25 and thus, will not be described.

In addition, each embodiment may also be embodied in the form of providing any one of the pair of first angle detection sensors 11A and 11B in the MMD 4. Similarly, each embodiment may also be embodied in the form of providing any one of the pair of second angle detection sensors 12A and 12B in the MMD 4.

In addition, a hardware configuration of the driving controller 5 can be variously modified. The driving controller 5 can be configured using at least one of an analog operation circuit or a digital operation circuit. The driving controller 5 may be configured with one processor or may be configured with a combination of two or more processors of the same type or different types. Examples of the processor include a central processing unit (CPU), a programmable logic device (PLD), and a dedicated electric circuit. The CPU is a well-known general-purpose processor that executes software (program) to function as various processing portions. The PLD is a processor such as a field programmable gate array (FPGA) that has a circuit configuration changeable after manufacture. The dedicated electric circuit is a processor such as an application specific integrated circuit (ASIC) that has a circuit configuration dedicatedly designed to perform specific processing.

What is claimed is:
1. An optical scanning device comprising:
    a mirror portion that has a reflecting surface on which an incidence ray is reflected;
    a first actuator that causes the mirror portion to swing around a first axis which is in a plane including the reflecting surface at a time of a standstill of the mirror portion;
    a second actuator that causes the mirror portion to swing around a second axis which is in the plane including the reflecting surface at the time of the standstill of the mirror portion and which intersects with the first axis; and
    at least one processor,
    wherein the processor is configured to:
        provide a first driving signal having a first driving frequency corresponding to a first set value to the first actuator;
        provide a second driving signal having a second driving frequency corresponding to a second set value to the second actuator;
        in a case of changing the first driving frequency and the second driving frequency, derive a greatest common divisor of the first set value and the second set value;
        change the first driving frequency by changing the first set value in units of a first number obtained by dividing the first set value by the greatest common divisor; and
        change the second driving frequency by changing the second set value in units of a second number obtained by dividing the second set value by the greatest common divisor.
2. The optical scanning device according to claim 1, wherein the processor is configured to change the first driving frequency and the second driving frequency at the same timing based on a common clock signal.
3. The optical scanning device according to claim 2, wherein the common clock signal is a clock signal in which a clock rises in accordance with a value obtained by multiplying the first set value by the second number, or a clock signal in which a clock rises in accordance with a value obtained by multiplying the second set value by the first number.
4. The optical scanning device according to claim 1, wherein the processor is configured to:
    provide the first driving signal of which the first driving frequency is changed at a timing when a clock of a first clock signal in which a clock rises in accordance with a value obtained by multiplying the first set value by the second number rises, to the first actuator; and
    provide the second driving signal of which the second driving frequency is changed at a timing when a clock of a second clock signal in which a clock rises in accordance with a value obtained by multiplying the second set value by the first number rises, to the second actuator.
5. The optical scanning device according to claim 4, wherein the processor is configured to change the first driving frequency and the second driving frequency, change the first set value and the second number, and the second set value and the first number to values corresponding to the first driving frequency and to the second driving frequency after change, generate the first clock signal based on the first set value and on the second number after change, and generate the second clock signal based on the second set value and on the first number after change.
6. The optical scanning device according to claim 4, wherein the processor is configured to change the first driving frequency and the second driving frequency and change a phase difference between the first clock signal and the second clock signal before changing the first driving frequency and the second driving frequency to a phase difference obtained by multiplying the phase difference by a ratio of the first driving frequency before change to the first driving frequency after change.

7. An image drawing system comprising:
the optical scanning device according to claim 1; and
a light source that irradiates the mirror portion with light.

8. A driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, and a second actuator that causes the mirror portion to swing around a second axis which is in the plane including the reflecting surface at the time of the standstill of the mirror portion and which intersects with the first axis, the driving method comprising:
provi ding a first driving signal having a first driving frequency corresponding to a first set value to the first actuator;
providing a second driving signal having a second driving frequency corresponding to a second set value to the second actuator;
deriving, in a case of changing the first driving frequency and the second driving frequency, a greatest common divisor of the first set value and the second set value;
changing the first driving frequency by changing the first set value in units of a first number obtained by dividing the first set value by the greatest common divisor; and
changing the second driving frequency by changing the second set value in units of a second number obtained by dividing the second set value by the greatest common divisor.

* * * * *